US008520950B2

(12) United States Patent
Ishii et al.

(10) Patent No.: US 8,520,950 B2
(45) Date of Patent: Aug. 27, 2013

(54) IMAGE PROCESSING DEVICE, IMAGE PROCESSING METHOD, PROGRAM, AND INTEGRATED CIRCUIT

(75) Inventors: Yasunori Ishii, Osaka (JP); Masao Hiramoto, Osaka (JP)

(73) Assignee: Panasonic Corporation, Osaka (JP)

( * ) Notice: Subject to any disclaimer, the term of this patent is extended or adjusted under 35 U.S.C. 154(b) by 80 days.

(21) Appl. No.: 13/386,500

(22) PCT Filed: Mar. 18, 2011

(86) PCT No.: PCT/JP2011/001609
§ 371 (c)(1),
(2), (4) Date: Jan. 23, 2012

(87) PCT Pub. No.: WO2011/148549
PCT Pub. Date: Dec. 1, 2011

(65) Prior Publication Data
US 2012/0121189 A1      May 17, 2012

(30) Foreign Application Priority Data
May 24, 2010   (JP) ................................. 2010-118605

(51) Int. Cl.
*G06K 9/46*     (2006.01)

(52) U.S. Cl.
USPC ......................................................... 382/197

(58) Field of Classification Search
None
See application file for complete search history.

(56) References Cited

U.S. PATENT DOCUMENTS

| | | | |
|---|---|---|---|
| 6,301,388 | B1 | 10/2001 | Hiramoto |
| 6,711,293 | B1 | 3/2004 | Lowe |
| 2008/0205764 | A1 | 8/2008 | Iwai et al. |
| 2010/0019962 | A1* | 1/2010 | Fujita ........................ 342/357.03 |
| 2010/0046823 | A1* | 2/2010 | O Ruanaidh et al. ......... 382/133 |
| 2010/0106426 | A1* | 4/2010 | Hunt et al. ...................... 702/19 |
| 2010/0142830 | A1 | 6/2010 | Yahata |

FOREIGN PATENT DOCUMENTS

| | | |
|---|---|---|
| JP | 3606430 | 10/2004 |
| JP | 2005-228150 | 8/2005 |
| JP | 2008-243175 | 10/2008 |
| JP | 2008-250950 | 10/2008 |

OTHER PUBLICATIONS

International Search Report issued Apr. 12, 2011 in corresponding International Application No. PCT/JP2011/001609.

(Continued)

*Primary Examiner* — Stephen R Koziol
*Assistant Examiner* — Delomia Gilliard
(74) *Attorney, Agent, or Firm* — Wenderoth, Lind & Ponack, L.L.P.

(57) ABSTRACT

The image processing device includes: a storage unit (211) holding intensity gradient vectors Vr, position vectors Rr, and voting vectors Ur of a reference image; an intensity gradient vector calculation unit (212) which calculates intensity gradient vectors Vs of a search image; and a position determination unit (213) which determines a position of the reference image in the search image. The position determination unit (213) includes: a sampling unit (214) which thins out a part of the intensity gradient vectors Vs and/or the voting vectors Ur; an origin position estimation unit (215) which locates voting vectors Ur at each starting position of intensity gradient vectors Vs and estimates ending positions of the voting vectors Ur as candidate points; and a re-verification unit (216) which locates the position vectors Rr at each candidate point and determines a candidate point having most intensity gradient vectors Vs at ending positions of the position vectors Rr as an origin position.

9 Claims, 24 Drawing Sheets

(56) References Cited

OTHER PUBLICATIONS

Masao Hiramoto et al., "Image Recognition Method Using Intensity Gradient Vectors", The Transactions of the Institute of Electronics, Information and Communication Engineers, Jun. 1, 2006, vol. J89-D, No. 6, pp. 1348-1358 (with English translation).

Herbert Bay et al., "SURF: Speeded Up Robust Features", ECCV, 2006, pp. 404-417.

* cited by examiner

Search Image

Voting Space (a)

| ⓵, 3, 6, 10 , 1 5, ㉑ 28, 36 , 4 5 |

A sum of the second to sixth elements
    Original Image: 2 + 3 + 4 + 5 + 6 = 20
    Integral Image: 21 - 1 = 20

IMAGE PROCESSING DEVICE, IMAGE PROCESSING METHOD, PROGRAM, AND INTEGRATED CIRCUIT

TECHNICAL FIELD

The present invention relates to image processing devices and image processing methods for detecting a designated object from an image and recognizing the object.

BACKGROUND ART

In recent years, with the advance of imaging elements, the number of pixels in digital still cameras and digital camcorders has been increased. The pixel increase allows a photographer to capture an image of a scenery as viewed by the photographer with a high resolution and in a wide view-field. Such an image captured with a high resolution and in a wide view-filed is called a giga-pixel image having approximately billion pixels, and researches and developments have been conducted for giga-pixel images.

Giga-pixel images have different problems in capturing and in viewing. In capturing, there are problems of blurs by hand shakes, a difficulty in focusing, and the like. However, since a giga-pixel image has a wide field, image capturing by a standing camera or camcorder can prevent these problems.

On the other hand, in viewing, there is a difficulty in finding a desired image from a giga-pixel image due to the huge number of pixels. If the entire image is to be viewed at once, a large display is necessary and therefore a system dedicated to the display is required. On the other hand, if a common display is used to view a giga-pixel image, the image is reduced too much to find a desired object.

Under the above-described circumstances, it has been demanded to detect a desired object from a giga-pixel image having a huge number of pixels in order to automatically find the object, thereby offering convenient viewing.

Various methods have conventionally been conceived to detect an object from an image. For example, one of them is disclosed in Patent Literature 1 to use feature descriptors called Scale-Invariant Feature Transform (SIFT). Another is disclosed in Non-Patent Literature 1 to use Speeded Up Robust Features (SURF).

SIFT is an algorithm for detecting feature points and describing local image features (hereinafter, referred to as "features"). The algorithm is explained briefly. SIFT includes: "detection" for scale and keypoint detection; and "description" for orientation calculation and feature description. First, scale and a keypoint are detected by using Difference Of Gaussian (DoG). Next, an orientation of the keypoint is determined in order to determine features invariant to rotation. Finally, based on the orientation, a feature of the keypoint is described. The following describes the details.

DoG is performed to detect scale and a keypoint. In DoG, two images filtered by respective two Gaussian filters having different dispersion coefficients are calculated, and a difference between the two images is determined. The resulting difference image is called a DoG image. The filtering sing a plurality of dispersion coefficients produces a plurality of DoG images. When output values of DoG images generated by changing a dispersion coefficient is observed for a certain point, the output values have extrema. The extremum has a correlation with an image size, so that when an image size is doubled, the extremum corresponds to an output value of a DoG image generated by doubled dispersion.

As described above, SIFT can describe relative a scale change by an extremum. Therefore, even if an actual size of an object is unknown, scale of the object is determined only by determining (locating) extrema from DoG images. Such feature is called a scale invariant feature that is invariant to image enlargement of reduction. Here, since a plurality of extrema are determined, any extremum that is not effective in recognition is eliminated according to by contrast or a curvature of an intensity value.

Next, the orientation calculation is described. The orientation calculation is processing of determining a gradient strength and a gradient direction of an image from which a keypoint is detected. A weighted histogram is generated based on gradient strengths and gradient directions around the keypoint. For example, a gradient direction is divided into 36 directions to structure the histogram. Here, direction components having 80% or more of a maximum value are allocated to an orientation of the keypoint.

A feature is described by using gradient information around the keypoint. First, in order to set a region around the keypoint to a coordinate axis in the direction of the keypoint, the region around the keypoint is rotated so that the keypoint direction is changed to a vertical direction. The rotated region is divided into 16 blocks having 4×4 blocks, and a gradient direction histogram in 8 directions (each 45 degrees) is generated for each of the blocks. Since a feature is described for a region in which the coordinate axis is set to the orientation direction, the feature is invariant to rotation.

As described above, there has been the method of determining SIFT descriptors from an image. However, the method has a problem of a large amount of DoG calculation. In order to address the problem, SURF features have been conceived.

Regarding SURF descriptors, extrema are not determined from DoG images, but determined by using fast-hessian detectors. A fast-hessian detector is generated by approximating a hessian matrix by a rectangle.

A determinant is determined by using hessian matrixes having different resolutions. Here, an integral image is used to determine the hessian matrixes. Therefore, a sum of various-sized rectangles is calculated by addition and subtraction of pixels at four points.

The integral image is described. For the sake of easy understanding, the integral image is explained as a one-dimensional image. It is assumed that a one-dimensional image is stored as shown in FIG. 27A. Under the assumption, an integral image is generated as described below. As shown in FIG. 27B, a pixel value of a certain pixel i in the integral image is calculated by adding a pixel value of the i-th pixel to a sum of pixel values of the first to (i−1)th pixels. A sum of the second to sixth elements is a difference between the sixth element and the first element in the integral image (FIG. 27C).

As described above, SURF differs from SIFT in that any DoG images are not required. Therefore, SURF is faster than SIFT. However, SURF needs to store a sum of pixel values (namely, an integral image), so that a large memory capacity is necessary. For example, the following describes the situation where an integral image in which a plurality of images are located in one dimension is generated. If a pixel value of one pixel is 1 byte, the second element requires 2 bytes and the third element requires 3 bytes in the integral image. As described above, a required memory capacity is gradually increased as the number of pixels is increased. In consideration of a giga-pixel image, the 1G-th element requires a memory amount of 1G bytes. Furthermore, if the same goes for every element, a memory capacity of 1G bytes×1G is eventually required. Therefore, application of SURF to giga-pixel images is not realistic.

In order to address the above problem, methods with a smaller memory amount and a smaller processing amount have been disclosed in Patent Literatures 2, 3, and 4, and Non-Patent Literature 2. By these methods, an intensity gradient is determined from an image, and based on the gradient, an object is detected from an image for recognition (hereinafter, referred to as a "recognition image").

CITATION LIST

Patent Literature

Patent Literature 1: U.S. Pat. No. 6,711,293
Patent Literature 2: Japanese Unexamined Patent Application Publication No. 2008-243175
Patent Literature 3: Japanese Unexamined Patent Application Publication No. 2008-250950
Patent Literature 4: Japanese Patent Publication No. 3606430
Non-Patent Literature 1: Herbert Bay, Tinne Tuytelaars and Luc Van Gool "SURF: Speeded up robust features", ECCV 2006, pp 404-417
Non-Patent Literature 1: Herbert Bay, Tinne Tuytelaars and Luc Van Gool "SURF: Speeded up robust features", ECCV 2006, pp 404-417 Non-Patent Literature 2: "Image Recognition Method Using Intensity Gradient Vectors", Masao Hiramoto, Takahiro Ogawa, Miki Haseyama, Journal D of The Institute of Electronics, Information and Communication Engineers (IEICE), Jun. 1, 2006, pp. 1348-1358

SUMMARY OF INVENTION

Problems that Invention is to Solve

In the conventional method disclosed in Patent Literature 2, when a feature is extracted, a support point near a certain gradient point (referred to as a base point) is selected based on the base point, and a minimum required score is selected. Gradient points are selected from a reference image and a recognition image, respectively, and a correspondence relationship between the gradient points is determined to perform object detection. However, in order to address changes in rotation or scale, it is necessary to use rotated reference images or scaled reference images. Therefore, a large amount of processing is required to address a desired change in rotation or scale.

In the conventional method disclosed in Patent Literature 3, gradients are classified, based on directions, into gradients with direction and gradients without direction, in order to achieve efficient verification. In object detection, a determination is made based on (a) the number of pixels matching in the same gradient direction and (b) a pattern matching degree of gradient directions. A pattern of a gradient direction varies depending on rotation. Therefore, also in this method, in order to determine the pattern matching degree of gradient directions, it is necessary to use a plurality of reference images addressing changes in rotation or scale.

In the conventional method disclosed in Patent Literature 4, an intensity gradient is determined in each of a vertical direction and a horizontal direction to generate intensity gradient vectors, and the object detection is performed using a similarity between the intensity gradient vectors. Here, a reference vector is defined, and an angle difference and a distance proportional relation which are relative to the reference vector are used to perform object detection robust to changes in rotation or scale.

Non-Patent Literature 2 also discloses object detection by using intensity gradient vectors. In Non-Patent Literature 2, a distance and an angle between an origin and an intensity gradient vector are defined. Such a vector indicating a distance and an angle between an origin and an intensity gradient vector is referred to as a position vector. The position vector indicating the distance and the angle and a voting vector indicating a direction opposite to the position vector are used in object detection. When common intensity gradient vectors in the reference image and the recognition image are found, voting is performed for a position indicated by the voting vector. If a correct correspondence relationship is found, a position having a maximum voting number is the origin.

This method also uses a relative angle and a relative position which are based on an origin. Therefore, this method is robust to changes in rotation and scale. However, in the methods disclosed in Patent Literatures 4 and Non-Patent Literature 2, it is necessary to determine, based on a reference image and a recognition image, a correspondence relationship between intensity gradient vectors. In the case of a giga-pixel image, the number of intensity gradient vectors is huge. For example, if M intensity gradient vectors are calculated from a reference image and N intensity gradient vectors are calculated from a recognition image, a total processing amount reaches O (M×N).

In order to solve the above-described conventional problems, an object of the present invention is to provide an image processing device and an image processing method which enable high-speed recognition of an object even from an image having a large number of pixels.

Solution to Problem

In accordance with an aspect of the present invention, there is provided a An image processing device that determines a position of a reference image in a search image, the image processing device including: a storage unit configured to store a plurality of intensity gradient vectors Vr, a plurality of position vectors Rr, and a plurality of voting vectors Ur in association with one another, the intensity gradient vectors Vr each indicating a gradient of an intensity value between pixels included in the reference image, the position vectors Rr being expressed by a first two-dimensional coordinate system and each extending from an origin set on a plane of the reference image to a starting position of a corresponding one of the intensity gradient vectors Vr, and the voting vectors Ur each being expressed by a corresponding second two-dimensional coordinate having a reference axis in a direction of a corresponding one of the intensity gradient vectors Vr and each extending from a starting position of the corresponding one of the intensity gradient vectors Vr to the origin and; an intensity gradient vector calculation unit configured to calculate a plurality of intensity gradient vectors Vs each indicating a gradient of an intensity value between pixels included in the search image; and a position determination unit configured to determine a position of the reference image in the search image, by determining, on a plane of the search image, a position corresponding to the origin on the plane of the reference image, based on (a) the intensity gradient vectors Vs which are calculated by the intensity gradient vector calculation unit and (b) the position vectors Rr and the voting vectors Ur which are stored in the storage unit, wherein the position determination unit includes: a sampling unit configured to extract target intensity gradient vectors Vs and target voting vectors Ur, by thinning out a part of at least one of (a) the intensity gradient vectors Vs calculated by the intensity gradient vector calculation unit and (b) the voting vectors Ur stored in the storage unit; an origin position estimation unit configured to (i) locate the target voting vectors Ur at each of starting positions of the target intensity gradient vectors Vs, wherein the target voting vectors Ur are rotated to match the reference axis to a corresponding one of the intensity gradient vectors Vs, and (ii) estimate ending positions of the target voting vectors Ur as candidate points for the position corresponding to the origin; and a re-verification unit configured to (i) locate the position vectors Rr on each of the candidate points estimated by the origin position estimation unit, and (ii) determine a candidate point among the candidate points as the position corresponding to the origin, the candidate point having a largest number of the intensity gradient vectors Vs each existing at an ending position of a corresponding one of the position vectors Rr.

With the above structure, the origin position estimation (voting) is performed after thinning out at least one of the intensity gradient vectors Vs and the voting vectors Ur. As a result, it is possible to reduce a processing amount. In addition, the re-verification can prevent deterioration of an accuracy of the processing.

The re-verification unit may be further configured to (i) calculate, for each of the candidate points estimated by the origin position estimation unit, a rotation angle between (a) an intensity gradient vector Vs existing at a starting position of a corresponding one of the voting vectors Ur indicating the each of the candidate points and (b) an intensity gradient vector Vr stored in the storage unit in association with the corresponding one of the voting vectors Ur, and (ii) determine a candidate point among the candidate points as the position corresponding to the origin, the candidate point having a largest number of the intensity gradient vectors Vs existing at an ending position of a corresponding one of the position vectors Rr which are rotated only by the rotation angle. With the above structure, it is possible to perform processing robust to rotation of the target object in the search image.

Furthermore, the re-verification unit may be further configured to (i) count, for each of the candidate points estimated by the origin position estimation unit, from among intensity gradient vectors Vs each existing at an ending position of a corresponding one of the position vectors Rr, intensity gradient vectors Vs each of which has a substantially same size or a substantially same direction as a size or direction of an intensity gradient vector Vr stored in the storage unit in association with the corresponding one of the position vectors Rr, and (ii) determine a candidate point among the candidate points as the position corresponding to the origin, the candidate point having a largest number of the counted intensity gradient vectors Vs.

Still further, the position determination unit may further include a feature calculation unit configured to calculate a feature that is a difference value between (a) a pixel value of a certain pixel and (b) a mean value of pixel values of a plurality of neighboring pixels of the certain pixel, and the re-verification unit may be further configured to (i) count, for each of the candidate points estimated by the origin position estimation unit, from among pixels each existing at an ending position of a corresponding one of the position vectors Rr, pixels each having a substantially same feature as a feature of a corresponding pixel in the reference image, and (ii) determine a candidate point among the candidate points as the position corresponding to the origin, the candidate point having a largest number of the counted pixels.

Like the re-verification in the above aspect, not only the presence of any intensity gradient vector Vs but also a reasonability of the presence are verified to enable higher-accuracy image recognition. It should be noted that the "substantially same" means allowance for an error of about ±10% or more preferably about ±5%.

Still further, the origin position estimation unit may be configured to estimate, as the candidate points, only points each of which is indicated by ending positions of the target voting vectors whose number is equal to or more than a predetermined value. With the above structure, it is possible to reduce the processing amount without deteriorating the processing accuracy.

Still further, the origin position estimation unit may be further configured to locate the target voting vectors Ur at each of starting positions of the target intensity gradient vectors Vs, the target voting vectors Ur having been scaled by a predetermined scaling factor. With the above structure, it is possible to perform processing robust to image enlargement/reduction (scaling) of the target object in the search image.

In accordance with another aspect of the present invention, there is provided an image processing method of causing an image processing device to determine a position of a reference image in a search image, the image processing device including a storage unit configured to store a plurality of intensity gradient vectors Vr, a plurality of position vectors Rr, and a plurality of voting vectors Ur in association with one another, the intensity gradient vectors Vr each indicating a gradient of an intensity value between pixels included in the reference image, the position vectors Rr being expressed by a first two-dimensional coordinate system and each extending from an origin set on a plane of the reference image to a starting position of a corresponding one of the intensity gradient vectors Vr, the voting vectors Ur each being expressed by a corresponding second two-dimensional coordinate having a reference axis in a direction of a corresponding one of the intensity gradient vectors Vr and each extending from a starting position of the corresponding one of the intensity gradient vectors Vr to the origin, and the image processing method including: calculating a plurality of intensity gradient vectors Vs each indicating a gradient of an intensity value between pixels included in the search image; and determining a position of the reference image in the search image, by determining, on a plane of the search image, a position corresponding to the origin on the plane of the reference image, based on (a) the intensity gradient vectors Vs which are calculated in the calculating and (b) the position vectors Rr and the voting vectors Ur which are stored in the storage unit, wherein the determining includes: extracting target intensity gradient vectors Vs and target voting vectors Ur, by thinning out a part of at least one of (a) the intensity gradient vectors Vs calculated in the calculating and (b) the voting vectors Ur stored in the storage unit; estimating ending positions of the target voting vectors Ur as candidate points for the position corresponding to the origin, by locating the target voting vectors Ur at each of starting positions of the target intensity gradient vectors Vs, wherein the target voting vectors Ur are rotated to match the reference axis to a corresponding one of the intensity gradient vectors Vs; and determining a candidate point among the candidate points as the position corresponding to the origin, the candidate point having a largest number of the intensity gradient vectors Vs each existing at an ending position of a corresponding one of the position vectors Rr, by locating the position vectors Rr on each of the candidate points estimated in the estimating.

In accordance with still another aspect of the present invention, there is provided a program causing a computer to determine a position of a reference image in a search image, the computer including a storage unit configured to store a plurality of intensity gradient vectors Vr, a plurality of position vectors Rr, and a plurality of voting vectors Ur in association with one another, the intensity gradient vectors Vr each indicating a gradient of an intensity value between pixels included in the reference image, the position vectors Rr being expressed by a first two-dimensional coordinate system and each extending from an origin set on a plane of the reference image to a starting position of a corresponding one of the intensity gradient vectors Vr, the voting vectors Ur each being expressed by a corresponding second two-dimensional coordinate having a reference axis in a direction of a corresponding one of the intensity gradient vectors Vr and each extending from a starting position of the corresponding one of the intensity gradient vectors Vr to the origin, and the program causing the computer to execute: calculating a plurality of intensity gradient vectors Vs each indicating a gradient of an intensity value between pixels included in the search image; and determining a position of the reference image in the search image, by determining, on a plane of the search image, a position corresponding to the origin on the plane of the reference image, based on (a) the intensity gradient vectors Vs which are calculated in the calculating and (b) the position vectors Rr and the voting vectors Ur which are stored in the storage unit, wherein the determining includes: extracting target intensity gradient vectors Vs and target voting vectors Ur, by thinning out a part of at least one of (a) the intensity gradient vectors Vs calculated in the calculating and (b) the voting vectors Ur stored in the storage unit; estimating ending positions of the target voting vectors Ur as candidate points for the position corresponding to the origin, by locating the target voting vectors Ur at each of starting positions of the target intensity gradient vectors Vs, wherein the target voting vectors Ur are rotated to match the reference axis to a corresponding one of the intensity gradient vectors Vs; and determining a candidate point among the candidate points as the position corresponding to the origin, the candidate point having a largest number of the intensity gradient vectors Vs each existing at an ending position of a corresponding one of the position vectors Rr, by locating the position vectors Rr on each of the candidate points estimated in the estimating.

In accordance with another aspect of the present invention, there is provided an integral circuit which determines a position of a reference image in a search image, the integral circuit being embedded in an image processing device including a storage unit configured to store a plurality of intensity gradient vectors Vr, a plurality of position vectors Rr, and a plurality of voting vectors Ur in association with one another, the intensity gradient vectors Vr each indicating a gradient of an intensity value between pixels included in the reference image, the position vectors Rr being expressed by a first two-dimensional coordinate system and each extending from an origin set on a plane of the reference image to a starting position of a corresponding one of the intensity gradient vectors Vr, the voting vectors Ur each being expressed by a corresponding second two-dimensional coordinate having a reference axis in a direction of a corresponding one of the intensity gradient vectors Vr and each extending from a starting position of the corresponding one of the intensity gradient vectors Vr to the origin, and the integral circuit including: an intensity gradient vector calculation unit configured to calculate a plurality of intensity gradient vectors Vs each indicating a gradient of an intensity value between pixels included in the search image; and a position determination unit configured to determine a position of the reference image in the search image, by determining, on a plane of the search image, a position corresponding to the origin on the plane of the reference image, based on (a) the intensity gradient vectors Vs which are calculated by the intensity gradient vector calculation unit and (b) the position vectors Rr and the voting vectors Ur which are stored in the storage unit, wherein the position determination unit includes: a sampling unit configured to extract target intensity gradient vectors Vs and target voting vectors Ur, by thinning out a part of at least one of (a) the intensity gradient vectors Vs calculated by the intensity gradient vector calculation unit and (b) the voting vectors Ur stored in the storage unit; an origin position estimation unit configured to (i) locate the target voting vectors Ur at each of starting positions of the target intensity gradient vectors Vs, wherein the target voting vectors Ur are rotated to match the reference axis to a corresponding one of the intensity gradient vectors Vs, and (ii) estimate ending positions of the target voting vectors Ur as candidate points for the position corresponding to the origin; and a re-verification unit configured to (i) locate the position vectors Rr on each of the candidate points estimated by the origin position estimation unit, and (ii) determine a candidate point among the candidate points as the position corresponding to the origin, the candidate point having a largest number of the intensity gradient vectors Vs each existing at an ending position of a corresponding one of the position vectors Rr.

Advantageous Effects of Invention

The present invention can offer an image processing device and an image processing method which enables high-speed recognition of an object even from an image having a large number of pixels.

BRIEF DESCRIPTION OF DRAWINGS

FIG. 27C shows that a sum of the second to sixth elements is a difference between the sixth element and the first element in the integral image.

DESCRIPTION OF EMBODIMENTS

The following describes embodiments of the present invention with reference to the drawings.

First Embodiment

In the first embodiment, the description is given for an image processing device and an image processing method which enable object recognition robust to rotation, image enlargement, or image reduction with a small processing amount.

Figure 1:
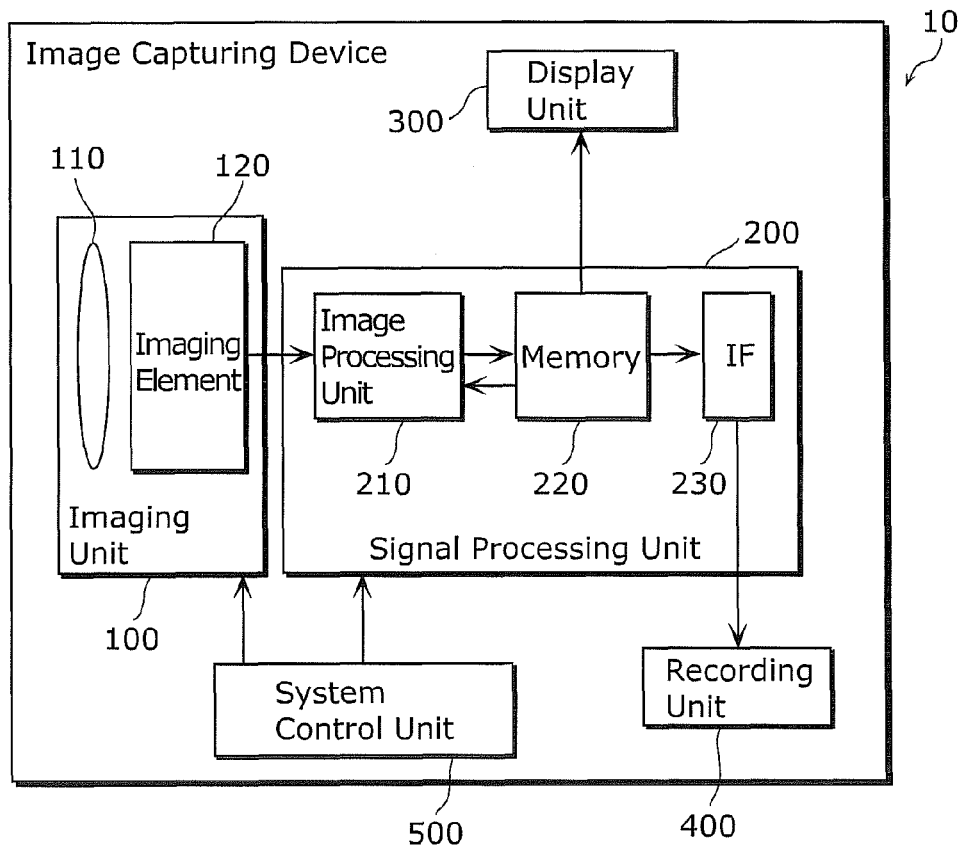
FIG. 1 is a block diagram of an image capturing device according to a first embodiment of the present invention.
Figure 2:
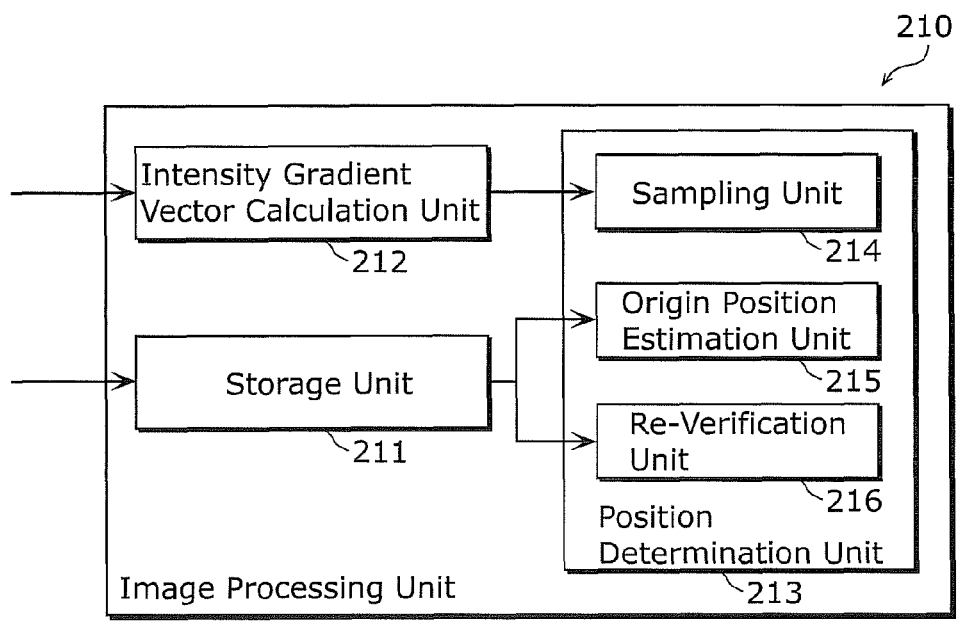
FIG. 2 is a block diagram of an image processing unit shown in FIG. 1.

Referring to FIGS. 1 and 2, an image capturing device 10 according to the first embodiment of the present invention is described. FIG. 1 is a block diagram of the entire image capturing device 10. FIG. 2 is a block diagram of an image processing unit 20.

As shown in FIG. 1, the image capturing device 10 according to the first embodiment includes: an imaging unit 100; a signal processing unit 200 that performs various signal processes; a display unit 300 that displays images captured by the imaging unit 100; a storage unit 400 that holds image data; and a system control unit 500 that controls the above units.

The imaging unit 100 includes an optical lens 110 and an imaging element 120. The optical lens 110 shifts to an optical axis direction to perform, for example, adjustment of a focus position or an enlargement factor. The imaging element 120 converts light passing though the optical lens 110 into electric charges, and thereby provides data of a search image that includes a target object to be searched out to the signal processing unit 200. The imaging element 120 is typically implemented as a Charge Coupled Device (CCD) or the like.

The signal processing unit 200 includes an image processing unit 210, a memory 220, and an Interface (IF) 230. The image processing unit 210 performs processing for determining a position of a reference image in the search image provided from the imaging unit 100. The memory 220 is a storage region in which image data that has been processed by the image processing unit 210 to be displayed on the display unit 300 is temporarily stored. The IF 230 exchanges data with the storage unit 400.

The display unit 300 displays the image data processed by the image processing unit 210. The detailed structure of the display unit 300 is not specifically limited. For example, a Liquid Crystal Display, a Plasma Display, or an Electro Luminescence Display, or the like can be adopted.

The storage unit 400 stores the image data processed by the signal processing unit 200 or other data. The detailed structure of the storage unit 400 is not specifically limited. For example, any storage medium capable of storing data, such as a Dynamic Random Access Memory (DRAM), a Static Random Access Memory (SDRAM), a Flash memory, or a Hard Disc Drive (HDD), can be adopted. The same goes for the storage unit 211 described later.

The system control unit 500 controls each of the structural elements in the image capturing device 10. The system control unit 500 may be implemented as, for example, a Central Processing Unit (CPU) that reads programs to execute them, or an integrated circuit.

The image processing device according to the first embodiment differs from the known image processing devices mainly in processing performed by the image processing unit 210. Therefore, the following description is given mainly for details of the image processing unit 210.

As shown in FIG. 2, the image processing unit 210 includes a storage unit 211, an intensity gradient vector calculation unit 212, and a position determination unit 213.

The storage unit 211 stores a plurality of intensity gradient vectors Vr, a plurality of position vectors Rr, and a plurality of voting vectors Ur, in association with one another. Here, the intensity gradient vectors Vr, the position vectors Rr, and the voting vectors Ur are generated from a reference image. Each of the intensity gradient vectors Vr is a vector indicating a gradient of an intensity value among a plurality of pixels included in the reference image. Each of the position vectors Rr is a vector extending from an origin set in the plane of the reference image to a starting position of a corresponding one of the intensity gradient vectors Vr. Each of the voting vectors Ur is a vector extending from a starting position of a corresponding one of the intensity gradient vectors Vr to the origin.

Here, if a position vector Rr and a voting vector Ur in association with each other are illustrated, the vectors have the same absolute value and opposite directions. However, the position vectors Rr are expressed by the same first two-dimensional coordinate system, while the voting vectors Ur are expressed by respective different second two-dimensional coordinate systems (different from the first two-dimensional coordinate system) each having a reference axis in a direction of a corresponding one of the intensity gradient vectors Vr.

The intensity gradient vector calculation unit 212 calculates other intensity gradient vectors Vs each indicating a gradient of an intensity value among pixels included in the search image. Here, a method of calculating the intensity gradient vectors Vr and a method of calculating the intensity gradient vectors Vs are the same and will be described later.

The position determination unit 213 determines a position of the reference image in the search image, by determining, on the plane of the search image, a position corresponding to the origin on the plane of the reference image, based on the intensity gradient vectors Vs which are calculated by the intensity gradient vector calculation unit 212 and the position vectors Rr and the voting vectors Ur which are stored in the storage unit 211. More specifically, the position determination unit 213 includes a sampling unit 214, an origin position estimation unit 215, and a re-verification unit 216.

The sampling unit 214 extracts target intensity gradient vectors Vs and target voting vectors Ur to be used in position determination, by thinning out a part of the vectors from at least one of (a) the intensity gradient vectors Vs calculated by the intensity gradient vector calculation unit 212 and (b) the voting vectors Ur stored in the storage unit 211. A typical example of the sampling method is random sampling. The following describes an example where a part of the intensity gradient vectors Vs is thinned out.

The origin position estimation unit 215 locates the target voting vectors Ur, which are rotated to match the reference axis to a corresponding one of the target intensity gradient vectors Vs, at each of starting positions of the target intensity gradient vectors Vs. Then, the origin position estimation unit 215 estimates ending positions of the target voting vectors Ur as candidate points for the position on the search image which corresponds to the origin.

The re-verification unit 216 locates each of the position vectors Rr at a corresponding one of the candidate points estimated by the origin position estimation unit 215. Then, the re-verification unit 216 specifies, as a position of the origin, a candidate point having the largest number of intensity gradient vectors Vs from among the intensity gradient vectors Vs which exist at the ending points of the respective position vectors Rr.

Figure 3:
FIG. 3 shows an example of a reference image.
Figure 4:
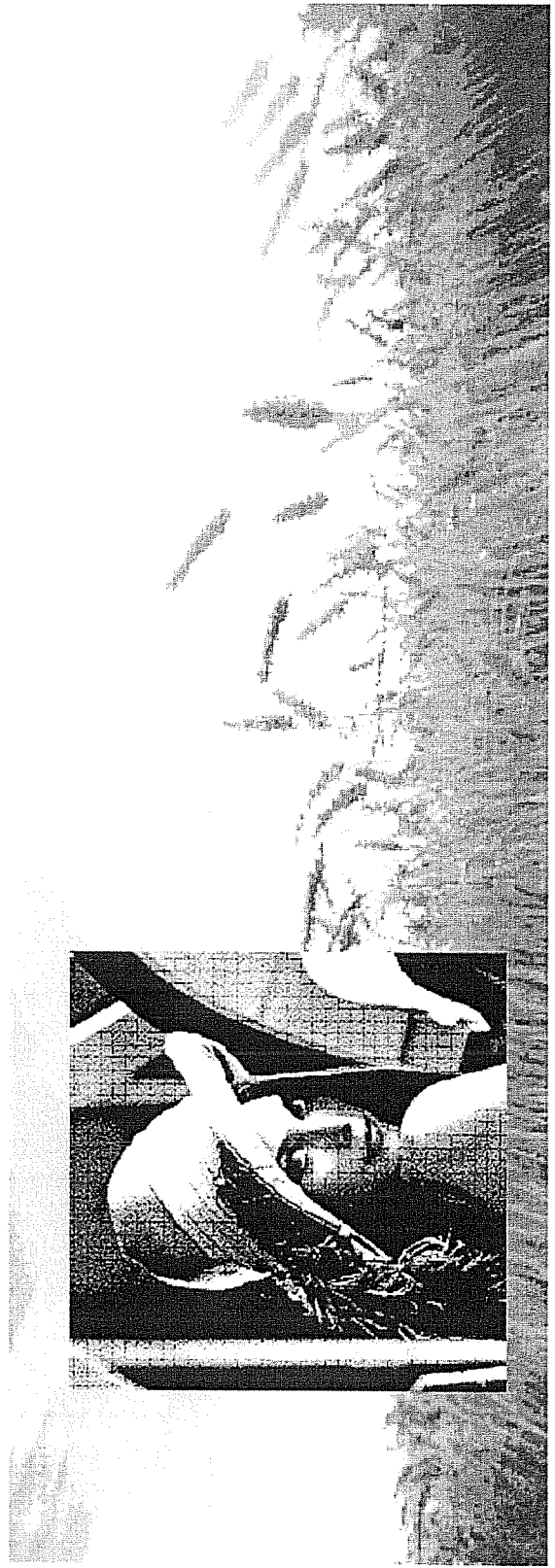
FIG. 4 shows an example of a search image.

Referring to FIGS. 3 to 16, the processing performed by the image processing unit 210 is described. First, FIG. 3 is a diagram showing an example of the reference image. FIG. 4 is a diagram showing an example of the search image.

In the first embodiment, image recognition based on intensity gradient vectors is performed. The image recognition based on intensity gradient vectors refers to processing of searching the search image for the same image as the reference image, by using a relationship between intensity gradient vectors in the reference image and intensity gradient vectors in the search image.

In the image recognition based on intensity gradient vectors, image data is converted into pieces of intensity gradient vector data. Then, data for recognition (hereinafter, referred to as "recognition data") is obtained from the pieces of intensity gradient vector data. The recognition data is voting vectors each pointing from a position of each of the intensity gradient vectors to an origin set to be a given position. After that, intensity gradient vectors in the search image are determined, and voting is performed in the search image by using the voting vectors. Thereby, the object recognition is performed.

Figure 5:
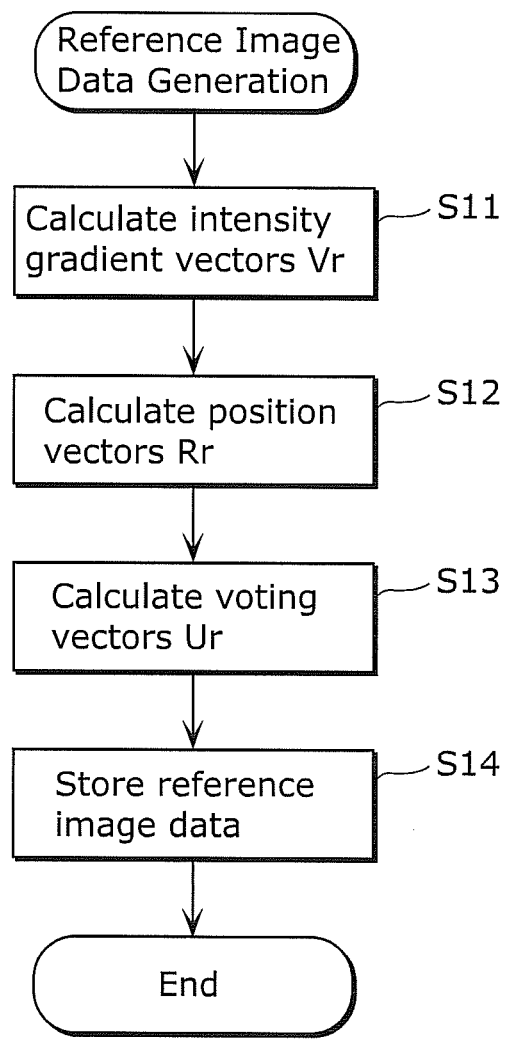
FIG. 5 is a flowchart of generation of reference image data.

First, referring to FIGS. 5 to 10, the description is given for reference image data generation for generating reference image data including intensity gradient vectors Vr, position vectors Rr, voting vectors Ur from the reference image shown in FIG. 3. FIG. 5 is a flowchart of the reference image data generation. FIGS. 6 to 10 are schematic diagrams showing each kind of vectors at each step in the reference image data generation.

The reference image data generation is described below. The reference image refers to an image as shown in FIG. 3 in which a target object to be searched out is shown in the most of the image region. The reference image may be an image showing only the target object. In recognition, a location of the target object is determined in the search image.

First, intensity gradient vectors Vri (where i=1 to 4) in the reference image are calculated (S11).

Then, the reference image is smoothed. Thereby, noise can be reduced. As a result, in extraction of intensity gradient (referred to also as an "edge") which will be described later, unnecessary intensity gradient components can be removed. The following Mathematical Formula 1 is an example of a smoothing filter

[Math. 1]

$$f(x, y) = e^{-\frac{(x^2+y^2)}{2\sigma^2}} \quad \text{(Mathematical Formula 1)}$$

Here, as smoothing filtering, Gaussian filtering as expressed by Mathematical Formula 1 is performed on each of pixels included in the reference image. For example, 3×3 Gaussian kernel is generated by Mathematical Formula 1. The first embodiment is not limited to the above, but an mean value filter may be used. The mean value filter has advantages of a small calculation amount.

Next, intensity gradients are extracted from the reference image. The intensity gradient extraction is performed in an x-direction and in a y-direction. A intensity gradient operator may perform the extraction by using, for example, a Sobel operator.

An example of the intensity gradient operator is described below. There are various intensity gradient operators. In the following description, the Sobel operator generally used for extraction of intensity gradients is used. It is also possible to use any other techniques, such as a Prewitt filter and a difference filter for a difference among values of neighboring pixels. The following Mathematical Formulas 2 and 3 are examples of the Sobel filter.

[Math. 2]

$$\begin{pmatrix} -1 & 0 & 1 \\ -2 & 0 & 2 \\ -1 & 0 & 1 \end{pmatrix} \quad \text{(Mathematical Formula 2)}$$

[Math. 3]

$$\begin{pmatrix} -1 & -2 & -1 \\ 0 & 0 & 0 \\ 1 & 2 & 1 \end{pmatrix} \quad \text{(Mathematical Formula 3)}$$

Figure 6:
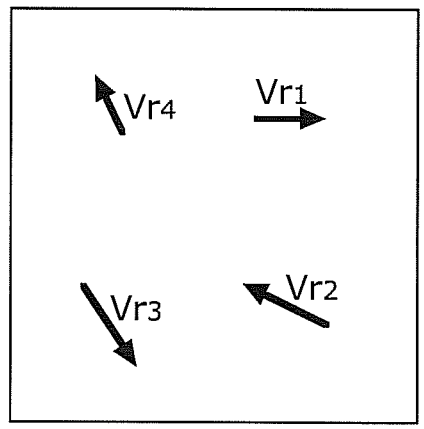
FIG. 6 shows an example of intensity gradient vectors Vr.

Mathematical Formula 2 expresses a filter for extracting intensity gradient in the x-direction of the reference image. On the other hand, Mathematical Formula 3 is a filter for extracting intensity gradient in the y-direction of the reference image. When these filters are applied to a pixel value of each of the pixels in the reference image, it is possible to generate pieces of data in the x-direction and pieces of data in the y-direction regarding intensity gradient vectors. FIG. 6 shows an example of the intensity gradient vectors $Vr_1$ to $Vr_4$ calculated from the reference image shown in FIG. 3.

Next, position vectors Rri (where i=1 to 4) each corresponding to a corresponding one of the intensity gradient vectors Vri are calculated (S12). The intensity gradient vectors Vri and the position vectors Rri are expressed in the same x-y coordinate system having an origin O at the center.

The method of calculating the position vectors is described below. Each of the position vectors Rri is a vector extending from the origin O set in the x-y plane of the reference image to a starting position of a corresponding one of the intensity gradient vectors Vri.

Figure 7:
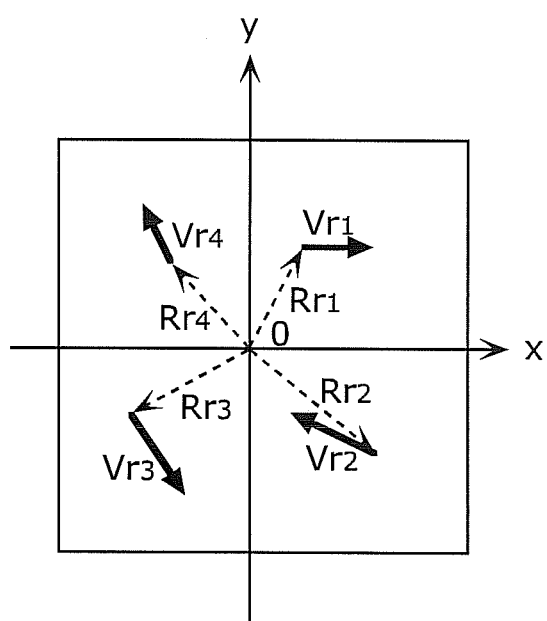
FIG. 7 shows an example of position vectors Rr.

FIG. 7 shows relationships among the intensity gradient vectors Vri and the position vectors Rri. As shown in FIG. 7, the position vectors Rri extend from the origin O defined on the reference image (for example, the center coordinates on the reference image), and each of the intensity gradient vectors Vri extend from a corresponding one of the position vectors Rri.

Based on the above information, voting vectors Uri which are pieces of recognition data are generated (S13). The voting vectors Uri are generated, for example, by Mathematical Formulas 4 and 5. Although the following describes an example of the reference image data generation by using Mathematical Formulas 4 and 5, these Mathematical Formulas can be used also to generate the pieces of recognition data. Here, in Mathematical Formulas 4 and 5, Vi represents an intensity gradient vector Vri, Ri represents a position vector Rri, and Ui represents a voting vector Uri.

[Math. 4]

$$\theta_i = \cos^{-1}\left(\frac{Vi \cdot (-Ri)}{|Vi||Ri|}\right)$$ (Mathematical Formula 4)

[Math. 5]

$$Ui = (|Ri|\cos\theta i, |Ri|\sin\theta i)$$ (Mathematical Formula 5)

Figure 8:
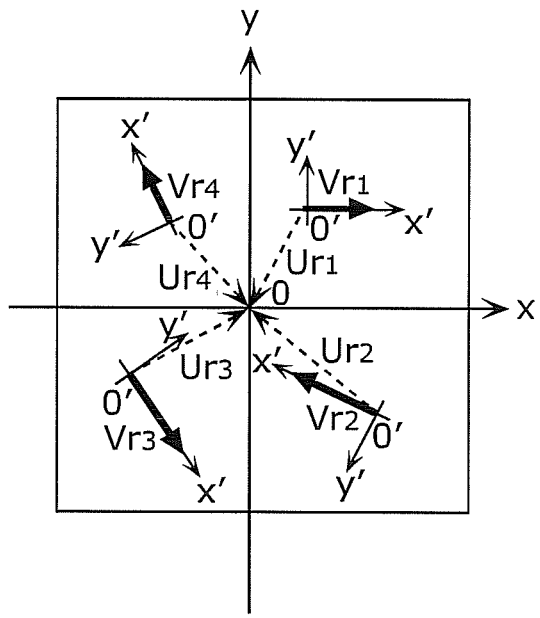
FIG. 8 shows an example of voting vectors Ur.

As shown in FIG. 8, each of the voting vectors Uri extends from a starting position of a corresponding one of the intensity gradient vectors Vri to the origin O. The voting vectors Uri are expressed by respective different two-dimensional coordinate systems (x'-y' coordinate systems) each of which has an origin set at a starting position of a corresponding intensity gradient vector Vri and has a horizontal reference axis (x'-axis) in a direction of the corresponding intensity gradient vector Vri. The voting vectors Uri are characterized in that positions indicated by all of the voting vectors Uri (namely, ending positions of the voting vectors Uri) are the same origin O.

Figure 9:
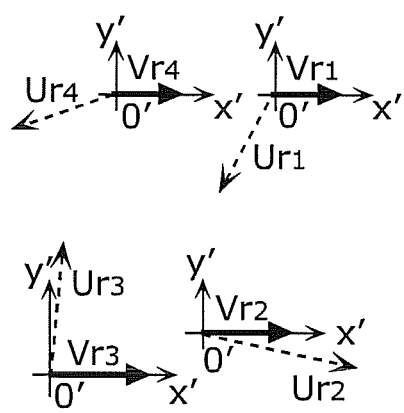
FIG. 9 shows the voting vectors Ur having respective reference axes in the same direction.
Figure 10:
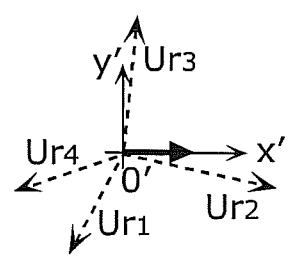
FIG. 10 shows the voting vectors Ur having the same origin O'.

In this example, if the voting vectors $Ur_1$ to $Ur_4$ are rotated so that all of the respective x'-axes are in a direction of the intensity gradient vector $Vr_1$, the result is as shown in FIG. 9. Then, if the voting vectors $Ur_1$ to $Ur_4$ shown in FIG. 9 are lapped over one another to have the same origin O', the result is as shown in FIG. 10. This means that the voting vectors $Ur_1$ to $Ur_4$ can be expressed as vectors radiated from the origin O' in the x'-y' coordinate system.

Then, the intensity gradient vectors Vri, the position vectors Rri, and the voting vectors Uri, which have been generated in the above-described processing, are stored in the storage unit 211 in association with one another (S14). Thereby, data for recognition has already been prepared for the reference image. It should be noted that the above-described processing may be performed by the image processing unit 210 that has obtained the reference image. It is also possible that the intensity gradient vectors Vri, the position vectors Rri, and the voting vectors Uri are calculated by an external device and then stored in the storage unit 211.

The following describes a principle of the recognition. First, the conventional method disclosed in Non-Patent Literature 2 and its problem are described. Then, the method according to the first embodiment of the present invention is described.

Figure 11:
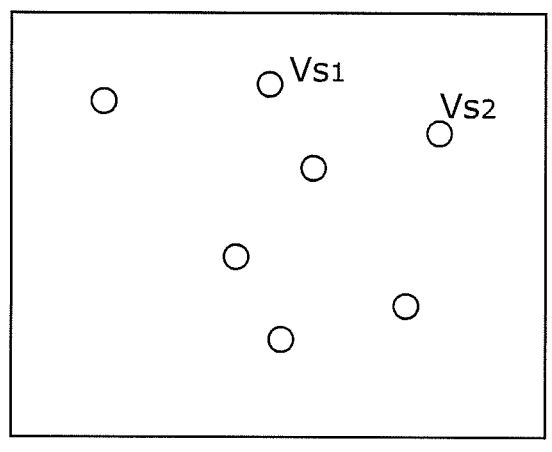
FIG. 11 shows a concept of image recognition by a voting method.
Figure 11:
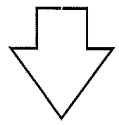
Figure 11:
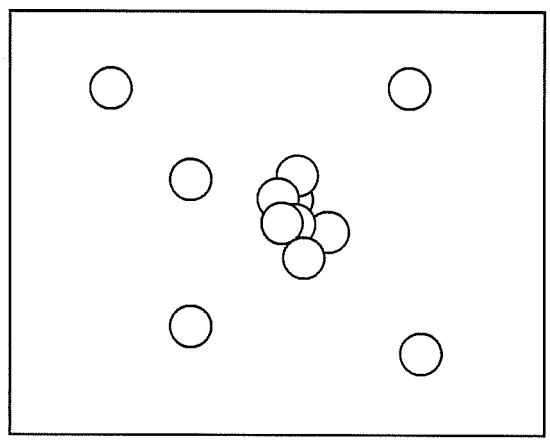

First, intensity gradient vectors Vsi and position vectors Rsi (where i=1 to n, n is the number of vectors) in a search image in which recognition is to be performed, and intensity gradient vectors Vrj and voting vectors Urj (j=1 to m, m is the number of vectors) in a reference image are prepared. By the above method, as shown in FIG. 11, voting is performed on the search image based on recognition data of the reference image. Therefore, a space for voting is necessary. In practice, the space is considered as a two-dimensional space having a plane (hereinafter, referred to as a "voting plane") larger than any one of the two compared images.

On the voting plane, an origin is set, and the intensity gradient vectors Vsi and the position vectors Rsi of the search image are located. Next, each of the intensity gradient vectors Vsi of the search image is compared to each of the intensity gradient vectors Vrj of the reference image. In the conventional method disclosed in Non-Patent Literature 2, if any one of the intensity gradient vector Vsi of the search image has the same absolute value as an absolute value of any one of the intensity gradient vector Vrj of the reference image, a voting vector Urj is located at a position indicated by a position vector Rsi on the voting plane. As a result, one vote is cast for the position indicated by the voting vector Urj. If the reference image is the same as the search image, a position cast by the largest number of votes is the origin, and the number of the votes is n. Therefore, if the value of n is greater than a predetermined threshold value, it is determined that the target object (namely, the reference image) exists in the search image.

In the case of a giga-pixel image, however, there are a large number of intensity gradient vectors Vsi in the search image and a calculation amount required to search for matching points is increased. Therefore, in the first embodiment, sampling of the intensity gradient vectors Vsi and re-verification of the voting results are performed as described below, so as to reduce processing loads.

Figure 12:
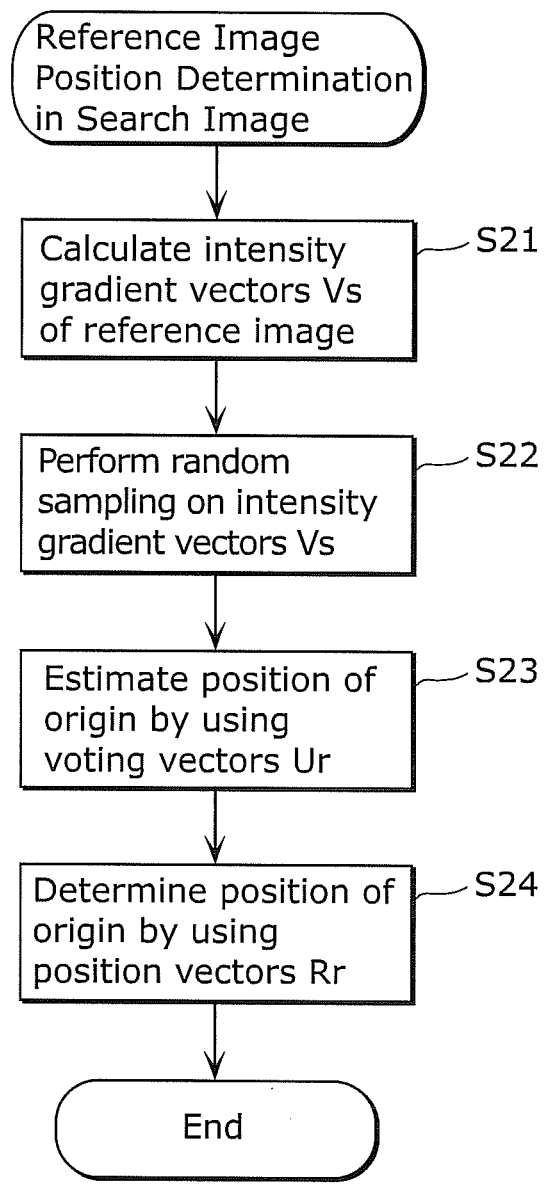
FIG. 12 is a flowchart of determining a position of a reference image in a search image.

With reference to FIGS. 12 to 16, the following describes determination of a position of the reference image in the search image (hereinafter, referred to as "position determination") according to the first embodiment of the present invention. FIG. 12 is a flowchart of the position determination. Each of FIGS. 13 to 16 is a schematic diagram showing vectors at a corresponding step in the position determination.

Figure 13:
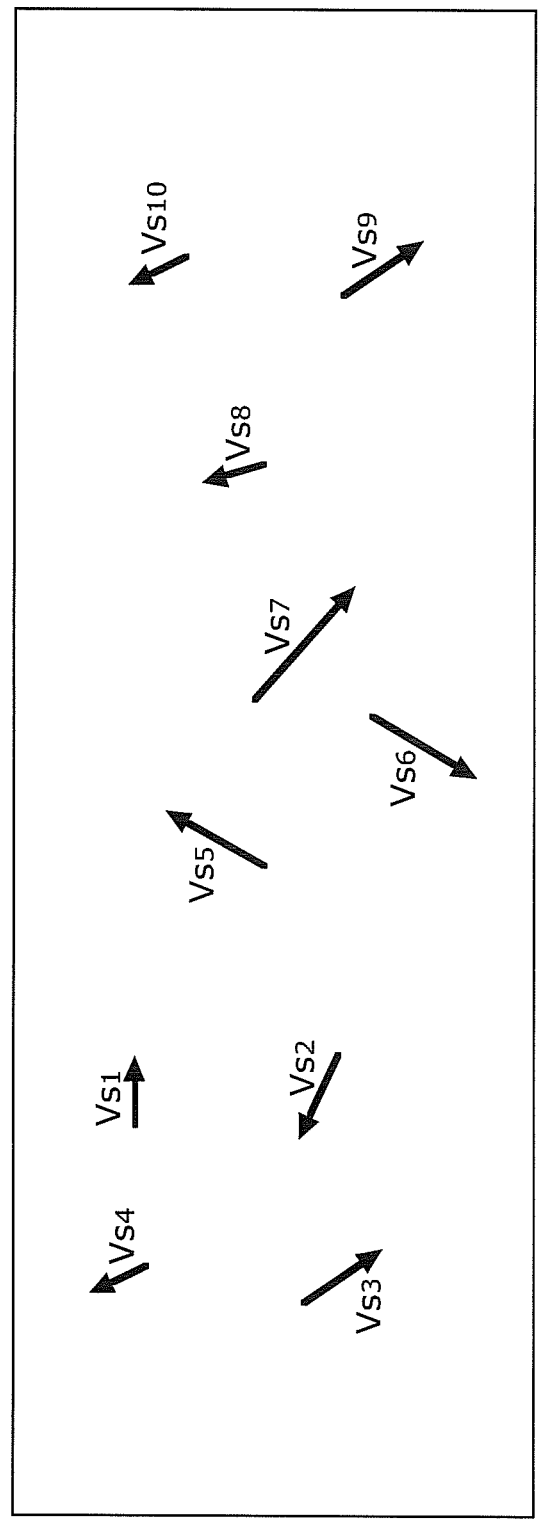
FIG. 13 shows an example of intensity gradient vectors Vs.

First, intensity gradient vectors Vsi (where i=1 to 10) in the search image are calculated. Since a method of calculating the intensity gradient vectors Vsi is the same as the above-described method of calculating the intensity gradient vectors Vri, the method will not be described again below. FIG. 13 shows the intensity gradient vectors $Vr_1$ to $Vr_{10}$ calculated from the search image shown in FIG. 4.

Figure 14:
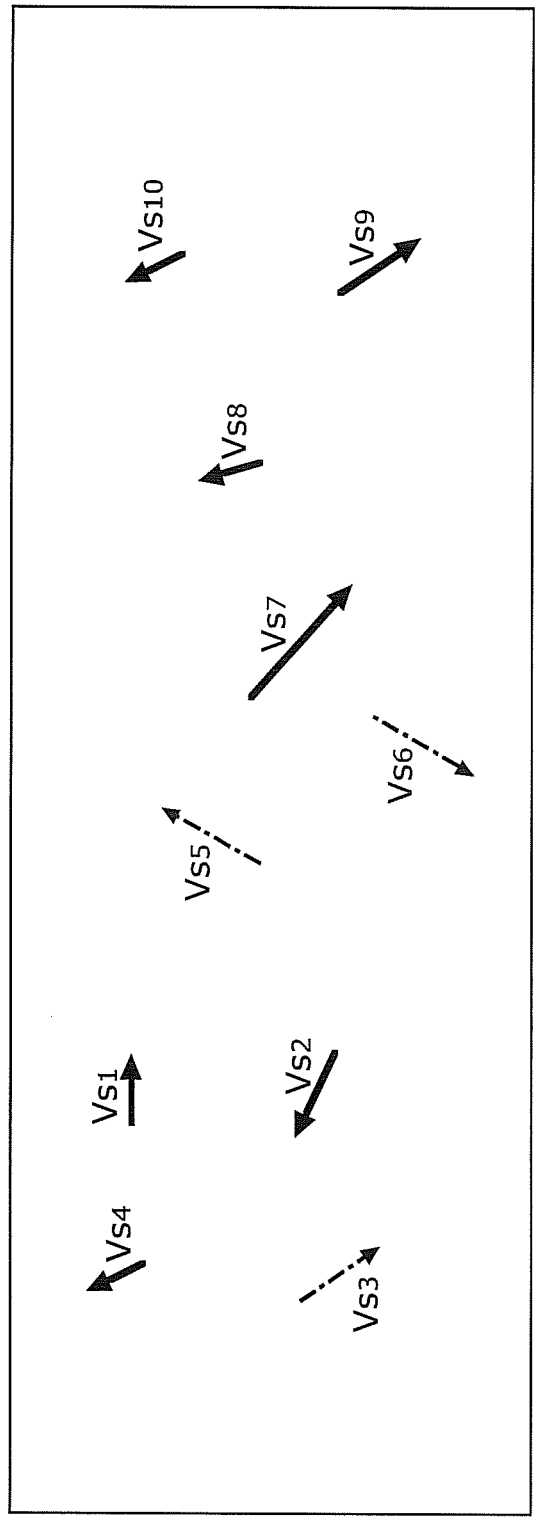
FIG. 14 shows an example of a result of sampling.

Next, the intensity gradient vectors Vsi in the search image are sampled at random (S22). It is thereby possible to reduce votes of unnecessary data, and eventually reduce noise and a calculation amount at the same time. In this example, as shown in FIG. 14, the intensity gradient vectors $Vs_3$, $Vs_5$, and $Vs_6$ are thinned out, and the intensity gradient vectors $Vs_1$, $Vs_2$, $Vs_4$, and $Vs_7$ to $Vs_{10}$ are extracted to be processed.

It should be noted that a sampling rate can be set arbitrarily. In general, as the sampling rate is decreased, the processing amount is reduced but an object recognition accuracy is also decreased. However, re-verification that will be described later can prevent the decrease in the object recognition accuracy. For example, even if the sampling rate is set as 25% or less, an adequate recognition accuracy can be ensured.

Then, voting is performed for each of the sampled intensity gradient vectors Vsi, by using the voting vectors Urj (S13). More specifically, for each of the sampled intensity gradient vectors Vsi, the voting vectors $Ur_1$ to $Ur_4$, which are rotated to match the x'-axis in FIG. 10 to a direction of the corresponding intensity gradient vector Vsi, are located on the search image so that starting positions of the voting vectors $Ur_1$ to $Ur_4$ are located at the same origin O'. The result in is shown in FIG. 15.

Figure 15:
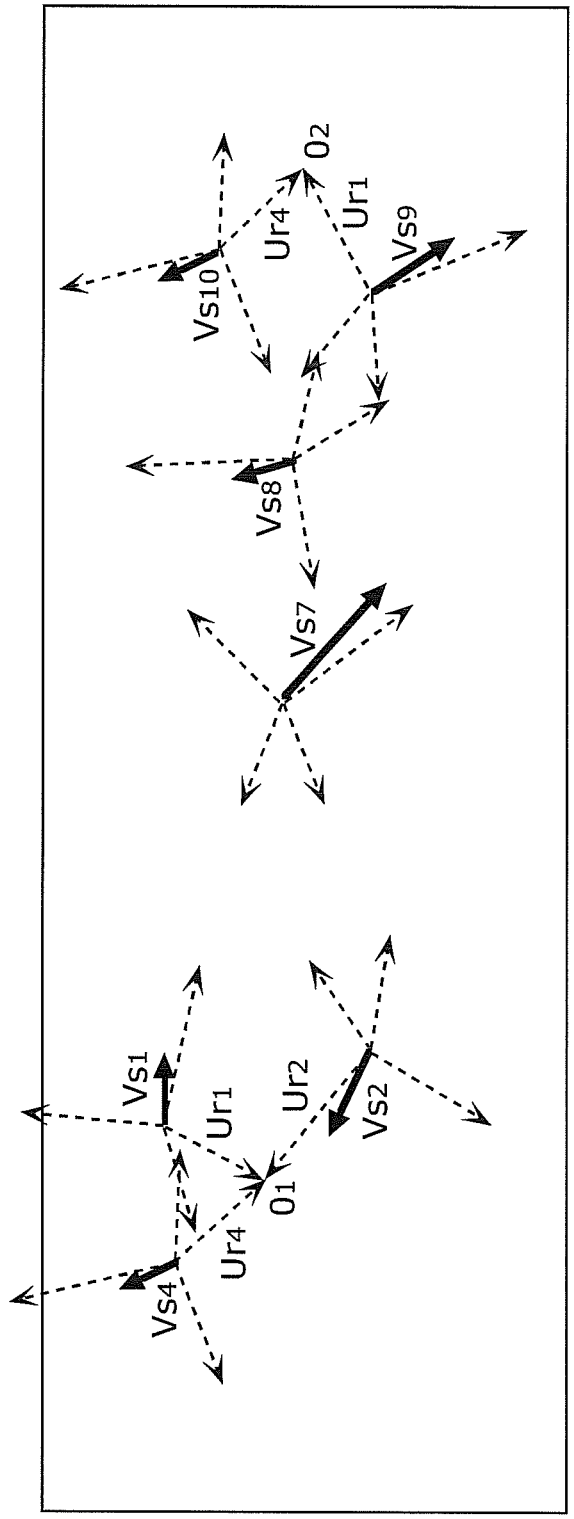
FIG. 15 shows an example of a result of voting.

In FIG. 15, the ending positions of the voting vectors $Ur_1$ to $Ur_4$ are determined as candidate points of the origin O in the search image. Here, all of the positions indicated by the voting vectors $Ur_1$ to $Ur_4$ may be set as candidate points. However, in terms of reduction of a processing amount, it is also possible that any point (isolation point) indicated by a single voting vector Uri is eliminated, and that any point indicated by ending positions of voting vectors Uri whose number is equal to or more than a predetermined value (for example, 2 vectors) is determined as a candidate point. In the example of FIG. 15, a candidate point $O_1$ indicated by three voting vectors $Ur_1$, $Ur_2$, and $Ur_4$ and a candidate point $O_2$ indicated by two voting vectors $Ur_1$ and $Ur_4$ are extracted.

More specifically, isolation points may be eliminated by the following method. As a definition of an isolation point, if the number of neighboring points, which are voted in a neighborhood of a certain point, is less than a predetermined value, the certain point is determined as an isolation point. Therefore, the number of neighboring points is counted to determine whether or not a target point is an isolation point. A mathematical formula for the determination is the following Mathematical Formula 6.

[Math. 6]

$$C = \sum_{p \in P} f(p) \begin{cases} f(p) = 1 & : \text{if } (p > 0) \\ f(p) = 0 & : \text{otherwise} \end{cases} \quad \text{(Mathematical Formula 6)}$$

In Mathematical Formula 6, P represents a set of neighboring points of a target point, and p represents a neighboring point. Furthermore, f(p) is a function indicating below. If the neighboring point p is voted, f(p) returns 1. Otherwise, f(p) returns 0. Thereby, it is determined based on f(p) whether or not a voted point exists at the neighboring point p.

In summary, the voting is performed under hypothesis where each of the intensity gradient vectors Vsi sampled at random corresponds to the intensity gradient vectors Vrj in the reference image. If the hypothesis is correct, there is a set of voted points at an origin O on the voting plane. Otherwise, a target point is not relevant to the origin O and there is no such a set of voted vectors at the target point. Therefore, points (candidate points) each of which is cast by a large number of votes appear on the voting plane. As described above, the random sampling is performed, the voting is performed, and then points each of which has gained a score equal to more than a predetermined score are considered as candidates for the origin on the voting plane.

However, since the determined candidate points result from the random sampling, the voting results include noise components. As a result, dispersion of distribution on the voting plane is likely to be increased. In order to address this, in the first embodiment, the pieces of voted data are examined to re-verify their correctness (S24).

For the voted points (the candidate points $O_1$ and $O_2$, inverse-voting is performed by using m position vectors (inverse-voting vectors) Rri. If the voted point is correct, total m intensity gradient vectors Vsi should be located at the ending points indicated by the position vectors Rri. On the other hand, if the voted point is not correct, there are a small number of intensity gradient vectors Vsi at the ending points of the position vectors Rri. Therefore, it is possible to define a "similarity" based on a maximum value of m. If each of the candidate points is evaluated by the similarity, it is possible to determine a correct position of the O from among the plurality of candidate points.

Figure 16:
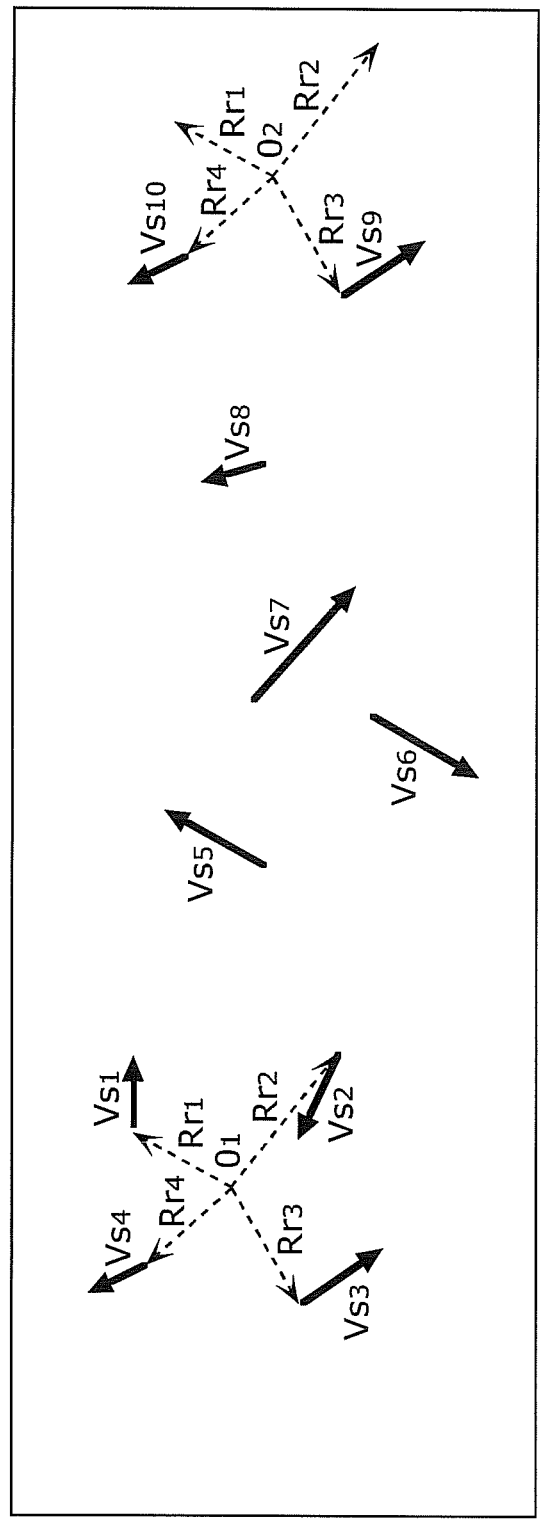
FIG. 16 shows an example of a result of re-verification.

More specifically, as shown in FIG. 16, the position vectors $Rr_1$ to $Rr_4$ shown in FIG. 7 are located in the search image so that each of the candidate points $O_1$ and $O_2$ matches the origin O. Then, it is determined whether or not each of the intensity gradient vectors Vsi exists on an ending point of a corresponding one of the position vectors $Rr_1$ to $Rr_4$. Here, in the re-verification, the intensity gradient vectors $Vr_3$, $Vr_5$, and $Vr_6$, which have been thinned out in the sampling (S22), are also re-verified.

In the example of FIG. 16, in directions indicated by the respective position vectors $Rr_1$ to $Rr_4$ extended from the candidate point $O_1$, there are four intensity gradient vectors $Vr_1$ to $Vr_4$, respectively. This means that a similarity at the candidate point $O_1$ is 4. On the other hand, in directions indicated by the respective position vectors $Rr_1$ to $Rr_4$ extended from the candidate point $O_2$, there are two intensity gradient vectors $Vr_9$ and $Vr_{10}$. This means that a similarity at the candidate point $O_2$ is 2. Then, the re-verification unit 216 determines, as a position of the origin O, the candidate $O_1$ having the highest similarity from among the plurality of candidate points $O_1$ and $O_2$. In other words, it is learned that there is an image that is substantially identical to the reference image shown in FIG. 3 in a region including the candidate point $O_1$ in the search image.

According to the above method, the random sampling can decrease the number of intensity gradient vectors Vsi used in image recognition, thereby reducing processes for determining a correspondence relationship among vectors. More specifically, in the case where there are m intensity gradient vectors Vri of the reference image and n intensity gradient vectors Vsi of the target image to be recognized, a processing amount is O (M*N/m) in the first embodiment of the present invention, while it has conventionally been O (M*N). Here, 1/m refers to a sampling rate of the intensity gradient vectors Vsi of the search image.

However, if pixel values are interpolated in geometric conversion such as rotation or scaling (image enlargement or reduction) as disclosed in the conventional technique of Non-Patent Literature 2, an absolute value of the intensity gradient vector Vsi of the search image is not equal to an absolute value of the intensity gradient vector Vrj of the reference image, which makes it difficult to determine a correspondence relationship between the vectors.

In order to address the scaling (image enlargement and reduction), at S23 in FIG. 12, voting is performed by changing a scaling factor of the voting vectors Urj (For example, if the scaling factor is set in a range between 0.7 times to 1.3 times, voting can be performed as long as a size difference between the target object in the search image and the reference image is within the scaling factor range).

More specifically, at S23 in FIG. 12, voting vectors Urj having a scaling factor of 1 time, voting vectors Urj having a scaling factor of 0.7 time, and voting vectors Urj having a scaling factor of 1.3 times are located at each of the target intensity gradient vectors Vsi. Then, points each of which indicated by voting vectors Urj having the same scaling factor and having the number grater than a predetermined threshold value are determined as candidate points. Furthermore, at S24 in FIG. 12, position vectors Rrj located at each of the candidate points are enlarged or reduced by the same scaling factor as that of voting vectors Urj indicating the corresponding candidate point.

Here, as a range of the scaling factor is decreased, robustness to image enlargement/reduction is increased but a processing amount is also increased. Therefore, it is desirable to control the increase in the processing amount by increasing a sampling rate in the sampling or a threshold value in the isolation point elimination as a range of the scaling factor is decreased.

Figure 17A:
FIG. 17A shows an example of a result of processing in the case where an image of a target object is enlarged in a search image.
Figure 17B:
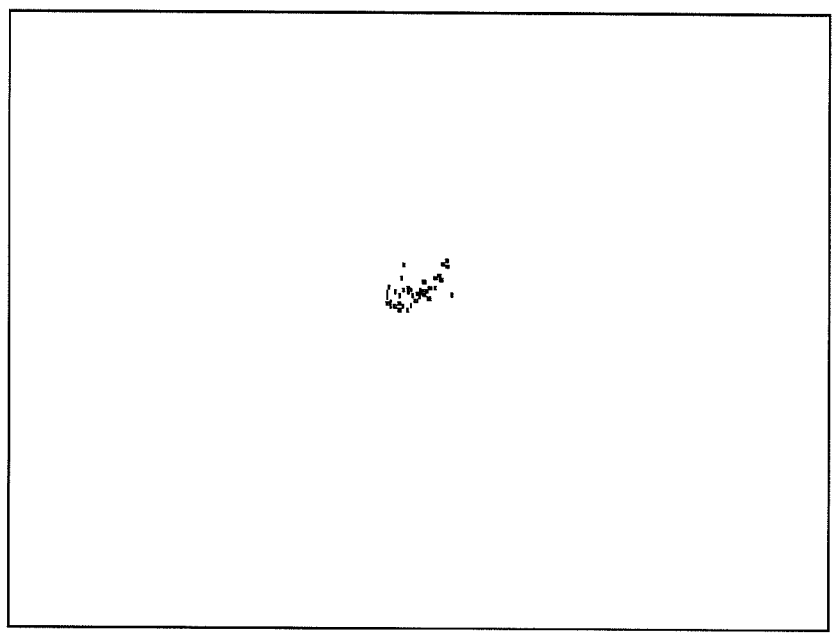
FIG. 17B shows distribution of candidate points in the case of FIG. 17A.
Figure 18A:
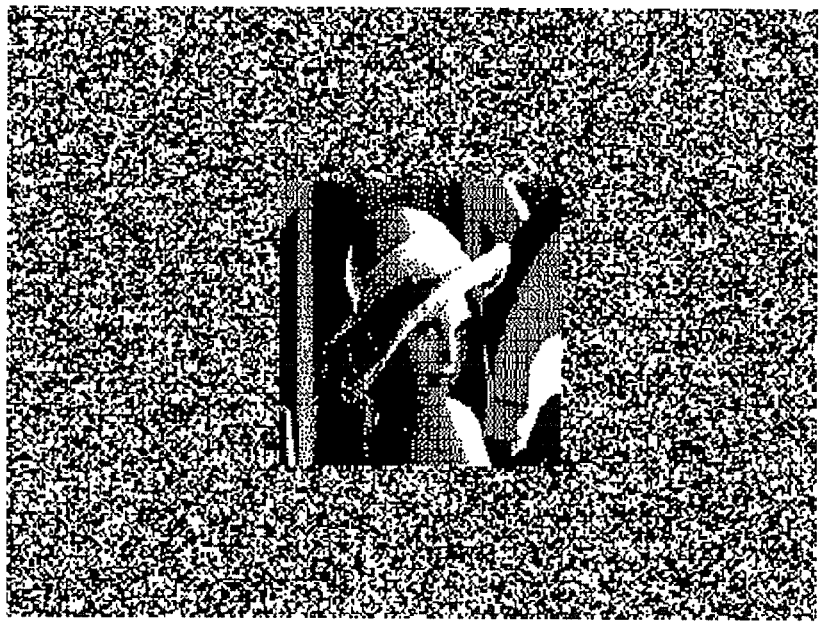
FIG. 18A shows an example of a result of processing in the case where an image of a target object is reduced in a search image.
Figure 18B:
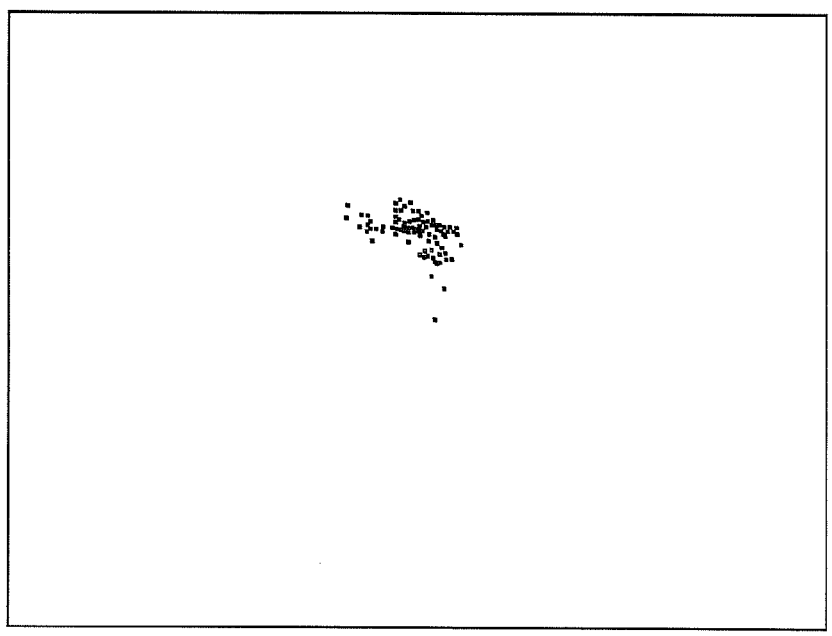
FIG. 18B shows distribution of candidate points in the case of FIG. 18A.
Figure 19:
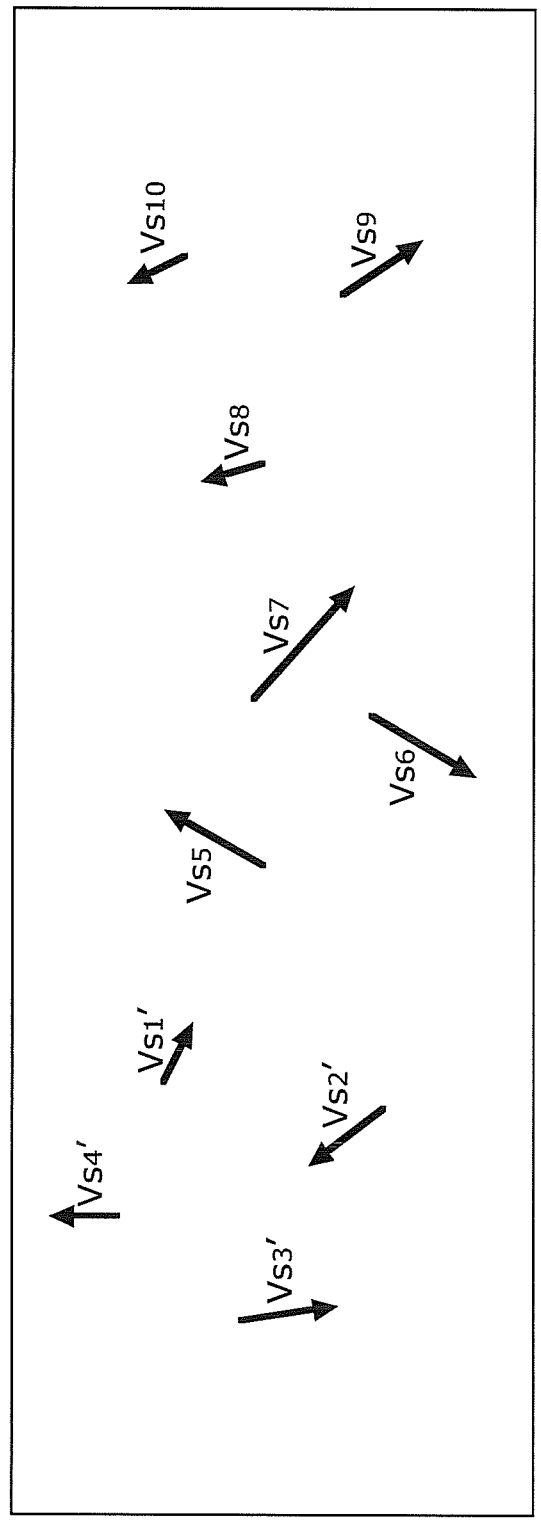
FIG. 19 is a diagram corresponding to FIG. 13 in the case where a target object is rotated.
Figure 20:
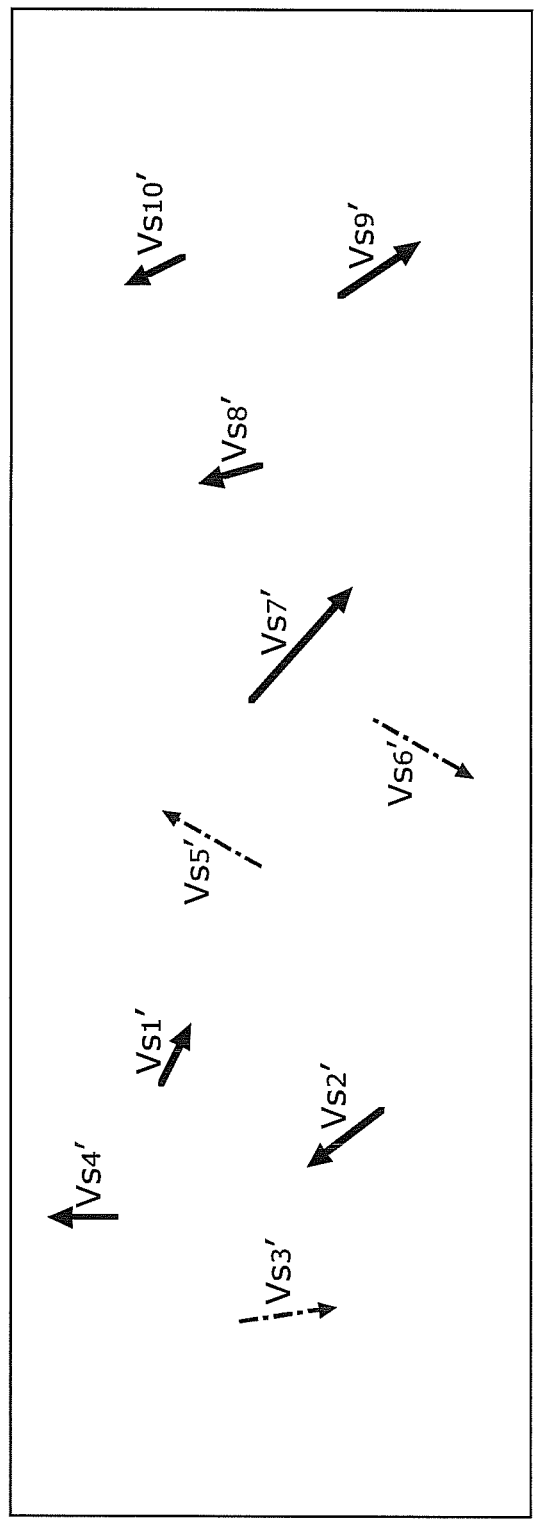
FIG. 20 is a diagram corresponding to FIG. 14 in the case where the target object is rotated.

FIGS. 17A, 17B, 18A, and 18B show results of processing in which a scaling factor of the target object in the search image is different from a scaling factor of the reference image. As shown in FIG. 17A, if the target object in the search image is enlarged to be 130% of the reference image, candidate points are located near the center as shown in FIG. 17B. On the other hand, as shown in FIG. 18A, if the target object in the search image is reduced to be 70% of the reference image, candidate points are dispersed as shown in FIG. 18B. This results from a difference caused by thinning out a part of pixels in the image reduction.

However, as shown in FIGS. 17A to 18B, a large number of voting points are located at the intended position, even in the case of image enlargement or reduction. As a result, it is confirmed that the above method is robust to scaling (image enlargement/reduction).

If the target object in the search image is rotated with respect to the reference image, it is necessary, in the re-verification of the voted points, to estimate an angle difference between the reference image and the target object in the voting image.

The estimation of an angle difference between the reference image and the target object in the voting image is described with reference to FIGS. 19 to 22. Here, FIGS. 19 to 22 correspond to FIGS. 13 to 16, respectively. Each of FIGS. 19 to 22 differs from a corresponding one of FIGS. 13 to 16 in that the target object in the search image is rotated only by $\theta$ in clockwise direction with respect to the reference image. More specifically, intensity gradient vectors $Vs_1'$ to $Vs_4'$ in each of FIGS. 19 to 22 are rotated only by $\theta$ in clockwise direction from the intensity gradient vectors $Vs_1$ to $Vs_4$, respectively, in a corresponding one of FIGS. 13 to 16.

Even if the target object in the search image is rotated with respect to the reference image, steps S21 to S23 in FIG. 12 can be executed as described above. However, after S23, it is necessary to perform the angle difference estimation as described below.

Figure 21:
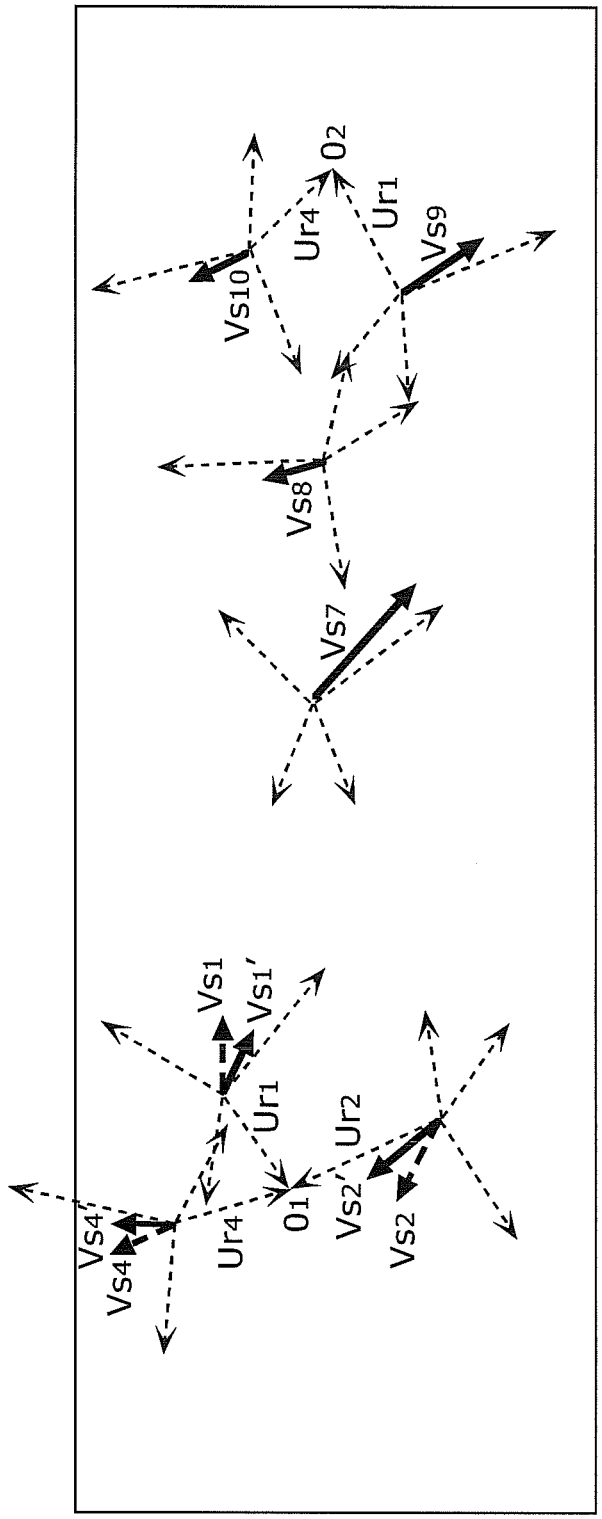
FIG. 21 is a diagram corresponding to FIG. 15 in the case where the target object is rotated.
Figure 22:
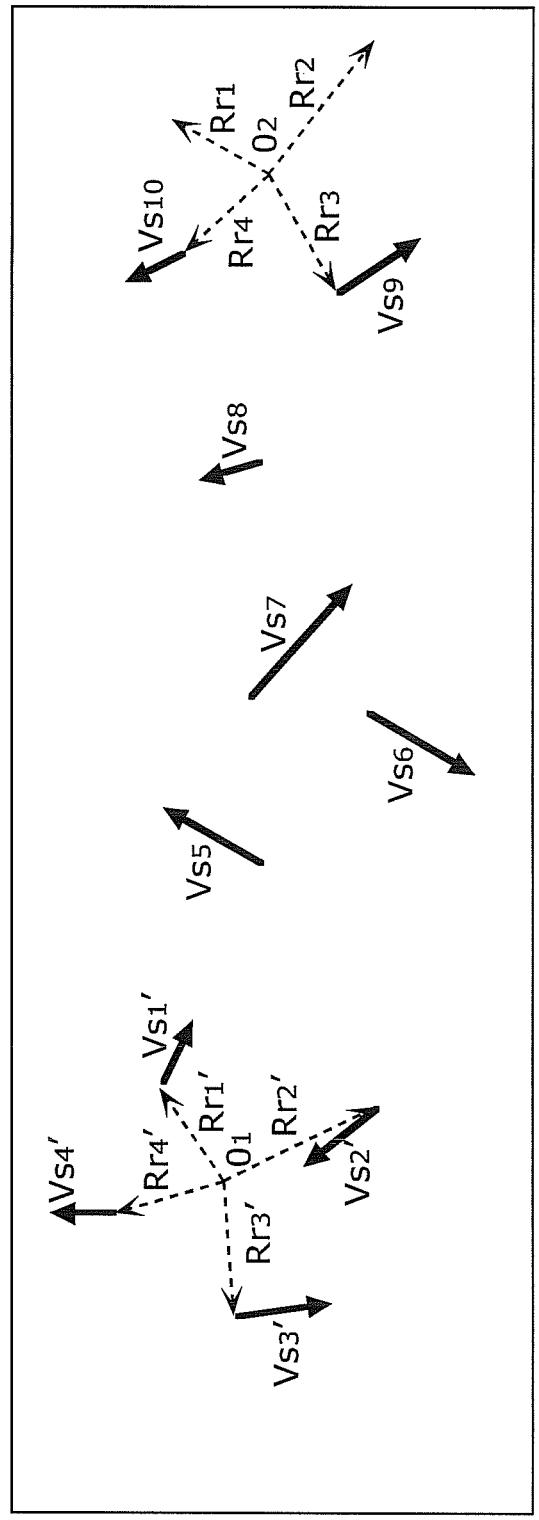
FIG. 22 is a diagram corresponding to FIG. 16 in the case where the target object is rotated.

More specifically, as shown in FIG. 21, an angle between (a) each of the intensity gradient vectors $Vs_1'$, $Vs_2'$, and $Vs_4'$ which are located at respective starting positions of respective voting vectors $Ur_1$, $Ur_2$, and $Ur_4$ that indicate the candidate point $O_1$, and (b) a corresponding one of intensity gradient vectors $Vs_1$, $Vs_2$, and $Vs_4$ which are stored in the storage unit 211 in association with the voting vectors $Ur_1$, $Ur_2$, and $Ur_4$, respectively is calculated.

An angle between intensity gradient vectors Vri and Vsi which correspond to each other is determined by the following Mathematical Formula 7.

[Math. 7]

$$\theta = \cos^{-1}\left(\frac{Vri \cdot Vsi}{|Vri||Vsi|}\right) \quad \text{(Mathematical Formula 7)}$$

Thereby, for a pair of intensity gradient vectors Vri and Vsi, it is possible to determine an angle difference between the reference image and the target object in the search image. Furthermore, for intensity gradient vectors Vri and Vsi located at starting positions of all of the voting vectors Uri, angle differences can be determined by the above method. Then, for example, a mode value of the angle difference is set to be an angle difference $\theta$ between the reference image (the target object in the reference image) and the search image.

Next, calculation of the similarity is described. The similarity is calculated by determining whether or not intensity gradient vectors Vsi are located at respective ending positions indicated by position vectors Rri' in consideration of the above-described rotation of the target object to be recognized. More specifically, the re-verification is performed by using position vectors $Rr_1'$ to $Rr_4'$ generated by rotating the position vectors $Rr_1$ to $Rr_4'$, respectively, shown in FIG. 7 by the angle difference $\theta$. In consideration of the rotation, each of the position vectors $Rr_1'$ to $Rr_4'$ is determined by the following Mathematical Formula 8.

[Math. 8]

$$(Rix \times \cos(\theta) + Riy \times \sin(\theta), -Rix \times \sin(\theta) + Riy \times \cos(\theta)) \quad \text{(Mathematical Formula 8)}$$

wherein Rix represents an x component of the target position vector Rri, and Riy represents a y component of the target position vector Rri. The position vectors $Rr_1'$ to $Rr_4'$ are referred to as rotated inverse-voting vectors. Inverse voting is performed by using m rotated inverse-voting vectors extended from a target voted point. If the voted point is correct, total m intensity gradient vectors Vsi should be located at respective ending positions indicated by the rotated inverse-voting vectors. On the other hand, if the voted point is not correct, there are less intensity gradient vectors Vsi at the inverse voted points. By calculating the similarity in consideration of the rotation, it is possible to perform recognition robust to geometric change of the target object to be recognized.

Figure 23A:
FIG. 23A is a diagram showing an example of a result of processing in the case where the target object is rotated by an angle of 40 degrees.
Figure 23B:
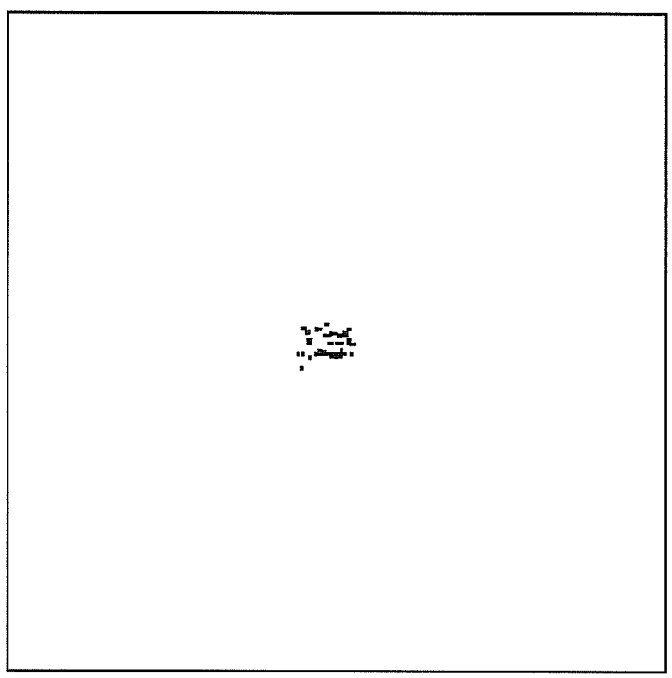
FIG. 23B shows distribution of candidate points in the case of FIG. 23A.
Figure 24A:
FIG. 24A shows an example of a result of processing in the case where the target object is rotated by an angle of 80 degrees.
Figure 24B:
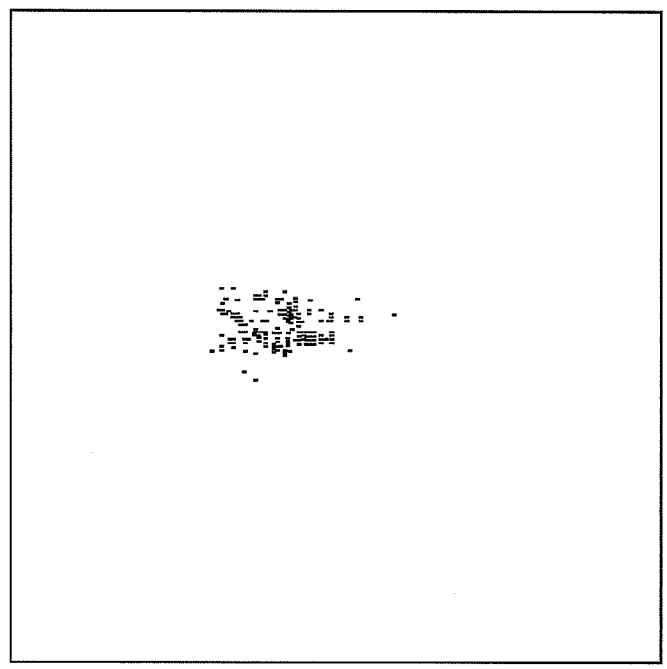
FIG. 24B shows distribution of candidate points in the case of FIG. 24A.

FIGS. 23A, 23B, 24A, and 24B show results of processing in which an angle between the target object in the search image is different from an angle of the reference image. As shown in FIG. 23A, if the target object in the search image is rotated by 40 degrees with respect to the reference image, candidate points are located near the center as shown in FIG. 23B. On the other hand, as shown in FIG. 24A, if the target object in the search image is rotated by 80 degrees with respect to the reference image, candidate points are dispersed as shown in FIG. 24B. The above results show that the object recognition accuracy is slightly decreased as the rotation angle is increased. However, as shown in FIGS. 23A to 24B, even if the target object is rotated, a large number of voted points are located at the intended point. As a result, it is confirmed that the above method is robust to rotation.

Second Embodiment

Since an image processing device according to a second embodiment of the present invention has the basically same structure as that described in the first embodiment, the structure is not described in detail again below.

The re-verification unit 216 according to the second embodiment further performs the following processing. For each of the candidate points estimated by the origin point estimation unit 215, the re-verification unit 216 according to the second embodiment counts the number of intensity gradient vectors Vs each of which has substantially the same size or the same direction as that of a corresponding one of the intensity gradient vector Vr stored in the storage unit 211 in association of a corresponding one of the position vectors Rr, from among intensity gradient vectors Vs located at ending positions of position vectors Rr. Then, the re-verification unit 216 determines, as a position of the origin, a candidate point indicated by the largest number of the counted intensity gradient vectors Vs.

Or, the position determination unit 213 according to the second embodiment further includes a feature calculation unit (not shown). The feature calculation unit calculates features that are a difference value between (a) a pixel value of a certain pixel and (b) a mean value of pixel values of a plurality of neighboring pixels of the certain pixel. In the above case, the re-verification unit 216 further performs the following processing. For each of the candidate points estimated by the origin point estimation unit 215, the re-verification unit 216 counts the number of pixels each of which has the substantially same features as those of a corresponding pixel in the reference image, from among pixels at ending positions of position vectors Rr. Then, the re-verification unit 216 determines, as a position of the origin, a candidate point having the largest number of the counted pixels.

In the image recognition described in the first embodiment, voting is performed for the randomly-sampled intensity gradient vectors Vsi, and inverse voting is performed for the results of the voting. As a result, if there is an intensity gradient vector Vsi, the similarity is counted by 1.

In the second embodiment, however, criteria are set to evaluate correctness of intensity gradient vectors Vsi located at inversely voted positions. The criteria enables not only determination of the presence of any intensity gradient vector Vsi, but also prevention of any wrong intensity gradient vector Vsi from being counted as a similarity. As a result, it is possible to further increase the object recognition accuracy.

The following describes the second embodiment in more detail.

As described in the first embodiment, the voting results can be re-verified by using rotated inverse-voting vectors. The intensity gradient vectors in the voting results do not always have the same strength between the reference image and the search image. However, since a completely different location is not selected for the target object to be recognized, a certain similarity is maintained between the intensity gradient vectors in the reference image and the intensity gradient vectors in the search image. Therefore, by providing a range for each of absolute values of the intensity gradient vectors Vsi and Vri, a similarity is counted only when the absolute values are highly similar to each other. In other words, in the first embodiment, a similarity is counted when an intensity gradient vector Vsi is found by using a rotated inverse-voting vector. However, in the second embodiment, a similarity is counted when a difference between (a) an absolute value of an intensity gradient vector Vsi of the search image and (b) an absolute value of the intensity gradient vector Vri of the reference image is within a range of N % (for example, 5%).

Thereby, the above counting enables not only determination of the presence of any intensity gradient vector Vsi, but also prevention of any impossible correspondence relationship from being counted, based on the above-described similarity between the absolute values. As a result, the object recognition is hardly affected by noise components and therefore has a high accuracy.

Furthermore, if geometric characteristics as described below are introduced in the re-verification, it is possible to evaluate results of re-voting. In the case of a change only in rotation, or only in scaling (image enlargement/reduction), the following characteristics are considered.

Figure 25:
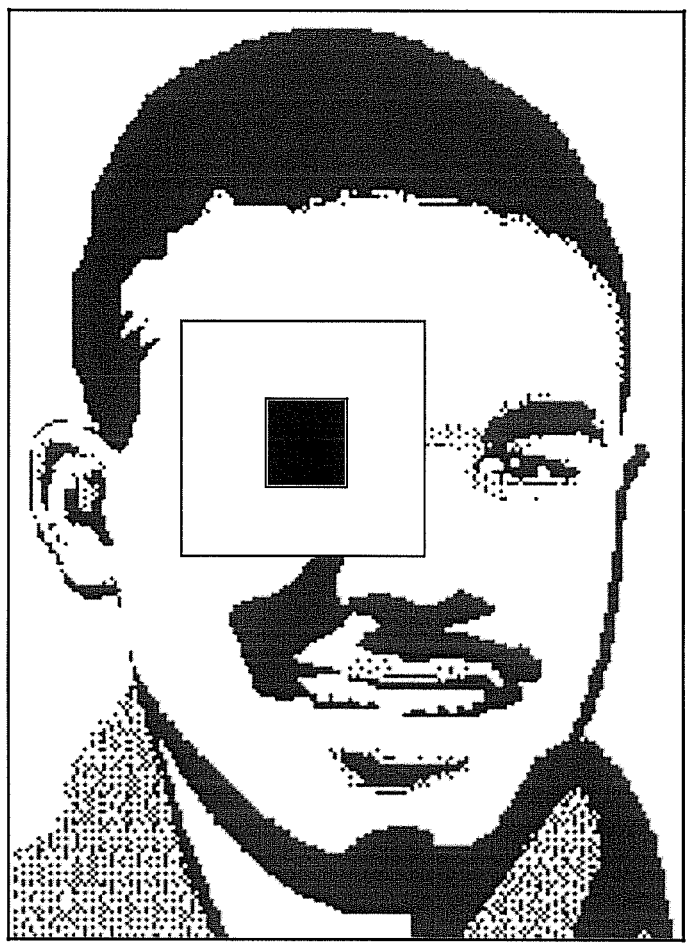
FIG. 25 shows an example of features invariant to a rotation direction.

If a change in rotation occurs, a pair (pixel pair) of a pixel in the reference image and a pixel in the search image for determining intensity gradient vectors Vri and Vsi is changed. In general, an intensity gradient vector is determined by a difference between a pixel pair in a horizontal direction and a difference between a pixel pair in a vertical direction. However, if the target object is rotated, the criteria in the horizontal and vertical directions are changed and therefore a directionality of gradient is changed. Therefore, by using features not influenced by the gradient directionality, reliability of results of the inverse voting is increased. The features for eliminating the directionality are assumed to be the features shown in FIG. 25.

The following describes an example where a filter for extracting features is applied to an eye in the image. In this filter, features are a difference between (a) a certain pixel (x, y) and (b) a mean value of neighboring pixels (x−1, y−1), (x, y−1), (x+1, y−1), (x−1, y), (x+1, y), (x−1, y+1), (x, y+1), and (x+1, y+1). The features are invariant to rotation. Therefore, if the target object in the search image is simply rotated with respect to the reference image, the features in the search image match features in the reference image at a position of an intensity gradient vector in an inversely-voted location. Therefore, by counting only positions in each of which the features in the search image match the features in the reference image, it is possible to further increase the object recognition accuracy. Or, even if features in the search image and the reference image do not completely match each other, a position having the features may be counted as a similarity as long as a difference between the features in the search image and reference image is within N %.

Figures 26, 27A, 27B:
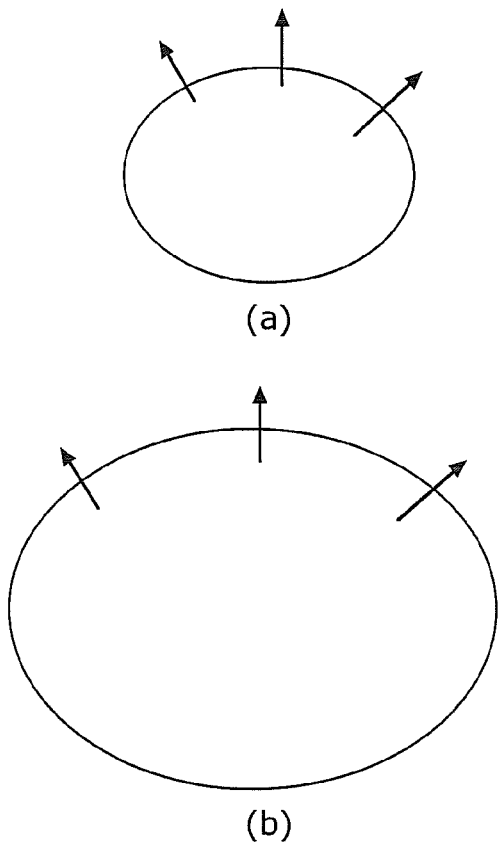
FIG. 26 shows an example of features invariant to scaling.
FIG. 27A shows an example of pixel values in a one-dimensional image to explain an integral image.
FIG. 27B shows the case where a value generated by summing pixels values of the first to (i−1)th pixels is added with a pixel value of the i-th pixel.

Next, the situation where the target object in the search image is only scaled (enlarged or reduced) is considered. Here, as shown in FIGS. 26A and 26B, an angle between an intensity gradient vector Vri in the reference image and an intensity gradient vector Vsi in the search image at a corresponding point is invariant to scaling (image enlargement/reduction). Therefore, at an inversely-voted position, an angle between the corresponding intensity gradient vectors Vri and Vsi is determined. Then, by counting only a position where the angle becomes 0 degree (in other words, a position where a direction of the intensity gradient vector Vri substantially matches the direction of the intensity gradient vector Vsi), it is possible to further increase the object recognition accuracy. Or, even if the directions do not completely match each other, the position may be counted as long as a difference between the directions is within N %.

Other Modifications

Although the present invention has been described using the above embodiments, the present invention is, of course, not limited to the above embodiments. The present invention may also be implemented as the followings.

Each of the above-described image processing devices according to the embodiments is a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor executes the computer program to cause each of the above-described image processing devices to perform its functions. Here, the computer program consists of combinations of instruction codes for issuing instructions to the computer to execute predetermined functions.

It should be noted that a part or all of the structural elements included in each of the above-described image processing devices may be implemented into a single Large Scale Integration (LSI). The system LSI is a super multi-function LSI that is a single chip into which a plurality of structural elements are integrated. More specifically, the system LSI is a computer system including a microprocessor, a ROM, a RAM, and the like. The RAM holds a computer program. The microprocessor executes the computer program to cause the system LSI to perform its functions.

It should also be noted that a part or all of the structural elements included in each of the above-described image processing devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor executes the computer program to cause the IC card or the module to perform its functions. The IC card or the module may have tamper resistance.

It should also be noted that the present invention may be the above-described method. The present invention may be a computer program causing a computer to execute the method, or digital signals indicating the computer program.

It should also be noted that the present invention may be a computer-readable recording medium on which the computer program or the digital signals are recorded. Examples of the computer-readable recording medium are a flexible disk, a hard disk, a Compact Disc (CD)-ROM, a magnetooptic disk (MO), a Digital Versatile Disc (DVD), a DVD-ROM, a DVD-RAM, a BD (Blue-ray® Disc), and a semiconductor memory. The present invention may be digital signals recorded on the recording medium.

It should also be noted in the present invention that the computer program or the digital signals may be transmitted via an electric communication line, a wired or wireless communication line, a network represented by the Internet, data broadcasting, and the like.

It should also be noted that the present invention may be a computer system including a microprocessor operating according to the computer program and a memory storing the computer program.

It should also be noted that the program or the digital signals may be recorded onto the recording medium to be transferred, or may be transmitted via a network or the like, so that the program or the digital signals can be executed by a different independent computer system.

It should also be noted that the above-described embodiments and modification may be combined.

Although the embodiments according to the present invention have been described with reference to the drawings, the present invention is not limited to the embodiments illustrated in the drawings. The embodiments illustrated in the drawings may be modified and varied within the same meanings and the scope of the present invention.

INDUSTRIAL APPLICABILITY

The present invention is useful as Automatic Exposure (AE) or Autofocus (AF) functions in digital still cameras and camcorders, functions for browsing images having a huge number of pixels, and the like. The present invention can be applied also to monitoring cameras, home interphones, and the like.

Reference Signs List

| | |
|---|---|
| 10 | image capturing device |
| 100 | imaging unit |
| 110 | optical lens |
| 120 | imaging element |
| 200 | signal processing unit |
| 210 | image processing unit |
| 211 | storage unit |
| 212 | intensity gradient vector calculation unit |
| 213 | position determination unit |
| 214 | sampling unit |
| 215 | origin position estimation unit |
| 216 | re-verification unit |
| 300 | display unit |
| 400 | storage unit |
| 500 | system control unit |

The invention claimed is:

1. An image processing device that determines a position of a reference image in a search image, said image processing device comprising:
a storage unit configured to store a plurality of intensity gradient vectors Vr, a plurality of position vectors Rr, and a plurality of voting vectors Ur in association with one another, the intensity gradient vectors Vr each indicating a gradient of an intensity value between pixels included in the reference image, the position vectors Rr being expressed by a first two-dimensional coordinate system and each extending from an origin set on a plane of the reference image to a starting position of a corresponding one of the intensity gradient vectors Vr, and the voting vectors Ur each being expressed by a corresponding second two-dimensional coordinate having a reference axis in a direction of a corresponding one of the intensity gradient vectors Vr and each extending from a starting position of the corresponding one of the intensity gradient vectors Vr to the origin and;
an intensity gradient vector calculation unit configured to calculate a plurality of intensity gradient vectors Vs each indicating a gradient of an intensity value between pixels included in the search image; and
a position determination unit configured to determine a position of the reference image in the search image, by determining, on a plane of the search image, a position corresponding to the origin on the plane of the reference image, based on (a) the intensity gradient vectors Vs which are calculated by said intensity gradient vector calculation unit and (b) the position vectors Rr and the voting vectors Ur which are stored in said storage unit,
wherein said position determination unit includes:
a sampling unit configured to extract target intensity gradient vectors Vs and target voting vectors Ur, by thinning out a part of at least one of (a) the intensity gradient vectors Vs calculated by said intensity gradient vector calculation unit and (b) the voting vectors Ur stored in said storage unit;
an origin position estimation unit configured to (i) locate the target voting vectors Ur at each of starting positions of the target intensity gradient vectors Vs, wherein the target voting vectors Ur are rotated to match the reference axis to a corresponding one of the intensity gradient vectors Vs, and (ii) estimate ending positions of the target voting vectors Ur as candidate points for the position corresponding to the origin; and
a re-verification unit configured to (i) locate the position vectors Rr on each of the candidate points estimated by said origin position estimation unit, and (ii) determine a candidate point among the candidate points as the position corresponding to the origin, the candidate point having a largest number of the intensity gradient vectors Vs each existing at an ending position of a corresponding one of the position vectors Rr.

2. The image processing device according to claim 1, wherein said re-verification unit is further configured to (i) calculate, for each of the candidate points estimated by said origin position estimation unit, a rotation angle between (a) an intensity gradient vector Vs existing at a starting position of a corresponding one of the voting vectors Ur indicating the each of the candidate points and (b) an intensity gradient vector Vr stored in said storage unit in association with the corresponding one of the voting vectors Ur, and (ii) determine a candidate point among the candidate points as the position corresponding to the origin, the candidate point having a largest number of the intensity gradient vectors Vs existing at an ending position of a corresponding one of the position vectors Rr which are rotated only by the rotation angle.

3. The image processing device according to claim 1,
wherein said re-verification unit is further configured to (i) count, for each of the candidate points estimated by said origin position estimation unit, from among intensity gradient vectors Vs each existing at an ending position of a corresponding one of the position vectors Rr, intensity gradient vectors Vs each of which has a substantially same size or a substantially same direction as a size or direction of an intensity gradient vector Vr stored in said storage unit in association with the corresponding one of the position vectors Rr, and (ii) determine a candidate point among the candidate points as the position corresponding to the origin, the candidate point having a largest number of the counted intensity gradient vectors Vs.

4. The image processing device according to claim 1,
wherein said position determination unit further includes a feature calculation unit configured to calculate a feature that is a difference value between (a) a pixel value of a certain pixel and (b) a mean value of pixel values of a plurality of neighboring pixels of the certain pixel, and
said re-verification unit is further configured to (i) count, for each of the candidate points estimated by said origin position estimation unit, from among pixels each existing at an ending position of a corresponding one of the position vectors Rr, pixels each having a substantially same feature as a feature of a corresponding pixel in the reference image, and (ii) determine a candidate point among the candidate points as the position corresponding to the origin, the candidate point having a largest number of the counted pixels.

5. The image processing device according to claim 1,
wherein said origin position estimation unit is configured to estimate, as the candidate points, only points each of which is indicated by ending positions of the target voting vectors whose number is equal to or more than a predetermined value.

6. The image processing device according to claim 1,
wherein said origin position estimation unit is further configured to locate the target voting vectors Ur at each of starting positions of the target intensity gradient vectors Vs, the target voting vectors Ur having been scaled by a predetermined scaling factor.

7. An image processing method of causing an image processing device to determine a position of a reference image in a search image, the image processing device including a storage unit configured to store a plurality of intensity gradient vectors Vr, a plurality of position vectors Rr, and a plurality of voting vectors Ur in association with one another, the intensity gradient vectors Vr each indicating a gradient of an intensity value between pixels included in the reference image, the position vectors Rr being expressed by a first two-dimensional coordinate system and each extending from an origin set on a plane of the reference image to a starting position of a corresponding one of the intensity gradient vectors Vr, the voting vectors Ur each being expressed by a corresponding second two-dimensional coordinate having a reference axis in a direction of a corresponding one of the intensity gradient vectors Vr and each extending from a starting position of the corresponding one of the intensity gradient vectors Vr to the origin, and said image processing method comprising:

calculating a plurality of intensity gradient vectors Vs each indicating a gradient of an intensity value between pixels included in the search image; and determining a position of the reference image in the search image, by determining, on a plane of the search image, a position corresponding to the origin on the plane of the reference image, based on (a) the intensity gradient vectors Vs which are calculated in said calculating and (b) the position vectors Rr and the voting vectors Ur which are stored in the storage unit, wherein said determining includes:

extracting target intensity gradient vectors Vs and target voting vectors Ur, by thinning out a part of at least one of (a) the intensity gradient vectors Vs calculated in said calculating and (b) the voting vectors Ur stored in the storage unit;

estimating ending positions of the target voting vectors Ur as candidate points for the position corresponding to the origin, by locating the target voting vectors Ur at each of starting positions of the target intensity gradient vectors Vs, wherein the target voting vectors Ur are rotated to match the reference axis to a corresponding one of the intensity gradient vectors Vs; and determining a candidate point among the candidate points as the position corresponding to the origin, the candidate point having a largest number of the intensity gradient vectors Vs each existing at an ending position of a corresponding one of the position vectors Rr, by locating the position vectors Rr on each of the candidate points estimated in said estimating.

8. A non-transitory computer-readable recording medium for use in a computer to determine a position of a reference image in a search image, the computer including a storage unit configured to store a plurality of intensity gradient vectors Vr, a plurality of position vectors Rr, and a plurality of voting vectors Ur in association with one another, the intensity gradient vectors Vr each indicating a gradient of an intensity value between pixels included in the reference image, the position vectors Rr being expressed by a first two-dimensional coordinate system and each extending from an origin set on a plane of the reference image to a starting position of a corresponding one of the intensity gradient vectors Vr, the voting vectors Ur each being expressed by a corresponding second two-dimensional coordinate having a reference axis in a direction of a corresponding one of the intensity gradient vectors Vr and each extending from a starting position of the corresponding one of the intensity gradient vectors Vr to the origin, and said recording medium having a computer program recorded thereon for causing the computer to execute:

calculating a plurality of intensity gradient vectors Vs each indicating a gradient of an intensity value between pixels included in the search image; and determining a position of the reference image in the search image, by determining, on a plane of the search image, a position corresponding to the origin on the plane of the reference image, based on (a) the intensity gradient vectors Vs which are calculated in said calculating and (b) the position vectors Rr and the voting vectors Ur which are stored in the storage unit, wherein said determining includes:

extracting target intensity gradient vectors Vs and target voting vectors Ur, by thinning out a part of at least one of (a) the intensity gradient vectors Vs calculated in said calculating and (b) the voting vectors Ur stored in the storage unit;

estimating ending positions of the target voting vectors Ur as candidate points for the position corresponding to the origin, by locating the target voting vectors Ur at each of starting positions of the target intensity gradient vectors Vs, wherein the target voting vectors Ur are rotated to match the reference axis to a corresponding one of the intensity gradient vectors Vs; and determining a candidate point among the candidate points as the position corresponding to the origin, the candidate point having a largest number of the intensity gradient vectors Vs each existing at an ending position of a corresponding one of the position vectors Rr, by locating the position vectors Rr on each of the candidate points estimated in said estimating.

9. An integral circuit which determines a position of a reference image in a search image, said integral circuit being embedded in an image processing device including a storage unit configured to store a plurality of intensity gradient vectors Vr, a plurality of position vectors Rr, and a plurality of voting vectors Ur in association with one another, the intensity gradient vectors Vr each indicating a gradient of an intensity value between pixels included in the reference image, the position vectors Rr being expressed by a first two-dimensional coordinate system and each extending from an origin set on a plane of the reference image to a starting position of a corresponding one of the intensity gradient vectors Vr, the voting vectors Ur each being expressed by a corresponding second two-dimensional coordinate having a reference axis in a direction of a corresponding one of the intensity gradient vectors Vr and each extending from a starting position of the corresponding one of the intensity gradient vectors Vr to the origin, and said integral circuit comprising:

an intensity gradient vector calculation unit configured to calculate a plurality of intensity gradient vectors Vs each indicating a gradient of an intensity value between pixels included in the search image; and a position determination unit configured to determine a position of the reference image in the search image, by determining, on a plane of the search image, a position corresponding to the origin on the plane of the reference image, based on (a) the intensity gradient vectors Vs which are calculated by said intensity gradient vector calculation unit and (b) the position vectors Rr and the voting vectors Ur which are stored in said storage unit, wherein said position determination unit includes:

a sampling unit configured to extract target intensity gradient vectors Vs and target voting vectors Ur, by thinning out a part of at least one of (a) the intensity gradient vectors Vs calculated by said intensity gradient vector calculation unit and (b) the voting vectors Ur stored in said storage unit;

an origin position estimation unit configured to (i) locate the target voting vectors Ur at each of starting positions of the target intensity gradient vectors Vs, wherein the target voting vectors Ur are rotated to match the reference axis to a corresponding one of the intensity gradient vectors Vs, and (ii) estimate ending positions of the target voting vectors Ur as candidate points for the position corresponding to the origin; and a re-verification unit configured to (i) locate the position vectors Rr on each of the candidate points estimated by said origin position estimation unit, and (ii) determine a candidate point among the candidate points as the position corresponding to the origin, the candidate point having a largest number of the intensity gradient vectors Vs each existing at an ending position of a corresponding one of the position vectors Rr.

\* \* \* \* \*